(12) United States Patent
Asakura et al.

(10) Patent No.: US 10,967,876 B2
(45) Date of Patent: Apr. 6, 2021

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Masahiko Asakura, Wako (JP); Hironobu Kiryu, Wako (JP); Satoru Otsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 197 days.

(21) Appl. No.: 16/080,314

(22) PCT Filed: Mar. 9, 2016

(86) PCT No.: PCT/JP2016/057454
§ 371 (c)(1),
(2) Date: Aug. 28, 2018

(87) PCT Pub. No.: WO2017/154152
PCT Pub. Date: Sep. 14, 2017

(65) Prior Publication Data
US 2019/0071098 A1    Mar. 7, 2019

(51) Int. Cl.
*B60W 50/02*    (2012.01)
*G08G 1/16*    (2006.01)
(Continued)

(52) U.S. Cl.
CPC ........ *B60W 50/029* (2013.01); *B60W 30/025* (2013.01); *B60W 30/18163* (2013.01);
(Continued)

(58) Field of Classification Search
CPC .... G05D 2201/0213; B60W 2050/046; B60W 30/09; B60W 30/095; B60W 30/12; B60W 50/14
See application file for complete search history.

(56) References Cited

U.S. PATENT DOCUMENTS 9,669,842 B2 * 6/2017 Matsumoto ......... B60W 50/045
10,429,848 B2 * 10/2019 Sato ..................... G05D 1/0214
(Continued)

FOREIGN PATENT DOCUMENTS

| CN | 102067052 | 5/2011 |
| CN | 102233877 | 11/2011 |

(Continued)

OTHER PUBLICATIONS

Japanese Office Action for Japanese Patent Application No. 2018-503929 dated Mar. 17, 2020.
(Continued)

*Primary Examiner* — Sarah B McPartlin
(74) *Attorney, Agent, or Firm* — Amin, Turocy & Watson, LLP

(57) ABSTRACT

A vehicle control system including: a surrounding state detector is configured to detect a state of the surroundings, a first running assistor is configured to automatically control at least acceleration/deceleration or steering such that the subject vehicle can run along a route to a destination; a monitor is configured to monitor whether or not the first running assistor is in a predetermined state and limit an operation of the first running assistor in a case in which the first running assistor is in the predetermined state; and a second running assistor is configured to assist a occupant's driving on the basis of the result of the detection executed and perform steering control according to a relation between the subject vehicle and a lane in a case in which the first
(Continued)

running assistor is determined as being in the predetermined state.

18 Claims, 12 Drawing Sheets

(51) Int. Cl.
  *B60W 50/029* (2012.01)
  *G06K 9/00* (2006.01)
  *B60W 30/02* (2012.01)
  *B60W 30/18* (2012.01)
  *G05D 1/00* (2006.01)

(52) U.S. Cl.
  CPC .......... *B60W 50/02* (2013.01); *G05D 1/0077* (2013.01); *G05D 1/0088* (2013.01); *G06K 9/00791* (2013.01); *G06K 9/00798* (2013.01); *G08G 1/167* (2013.01); *G05D 2201/0213* (2013.01)

(56) References Cited

U.S. PATENT DOCUMENTS

| | | | | |
|---|---|---|---|---|
| 2014/0088814 A1* | 3/2014 | You | ................ | G05D 1/0061 701/23 |
| 2016/0004254 A1* | 1/2016 | Matsumoto | ......... | B60W 50/045 701/23 |
| 2018/0088574 A1* | 3/2018 | Latotzki | ............... | G05D 1/0246 |
| 2019/0300013 A1* | 10/2019 | Shiraishi | .............. | G05D 1/0061 |
| 2020/0103896 A1* | 4/2020 | Batts | ................... | G05D 1/0061 |
| 2020/0198701 A1* | 6/2020 | McGill | ................ | G05D 1/0061 |

FOREIGN PATENT DOCUMENTS

| | | |
|---|---|---|
| CN | 103661364 | 3/2014 |
| CN | 104097642 | 10/2014 |
| CN | 104290745 | 1/2015 |
| CN | 104797479 | 7/2015 |
| CN | 104925064 | 9/2015 |
| CN | 105264450 | 1/2016 |
| JP | 07-033041 | 2/1995 |
| JP | 09-171409 | 6/1997 |
| JP | 10-076964 | 3/1998 |
| JP | 10-329575 | 12/1998 |
| JP | 11-105727 | 4/1999 |
| JP | 11-185200 | 7/1999 |
| JP | 2007-001475 | 1/2007 |
| JP | 2007-003287 | 1/2007 |
| JP | 2007-045332 | 2/2007 |
| JP | 2009-151522 | 7/2009 |
| JP | 2014-65478 | 4/2014 |
| JP | 2015-162005 | 9/2015 |
| JP | 2015-206655 | 11/2015 |
| JP | 2016-13751 | 1/2016 |
| JP | 2016-084038 | 5/2016 |
| WO | 2009/153661 | 12/2009 |
| WO | 2015/068491 | 5/2015 |
| WO | 2015/197251 | 12/2015 |

OTHER PUBLICATIONS

International Search Report and Written Opinion for International Patent Application No. PCT/JP2016/057454 dated May 17, 2016, 8 pages.

Japanese Office Action for Japanese Patent Application No. 2018-503929 dated May 14, 2019.

Japanese Office Action for Japanese Patent Application No. 2018-503929 dated Jan. 7, 2020.

Chinese Office Action for Chinese Patent Application No. 201680081794.6 dated Aug. 31, 2020.

* cited by examiner

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

In recent years, research on technologies for automatically controlling at least one of the acceleration/deceleration and the steering of a subject vehicle such that the subject vehicle runs along a route to a destination has progressed. In connection with this, a running control device for a vehicle that executes continuation of automatic driving while applying a restriction to steering when an abnormality is detected in an automatic steering means is known (for example, see Patent Document 1).

CITATION LIST

Patent Literature

[Patent Document 1]
Japanese Unexamined Patent Application, First Publication No. Hei10-76964

SUMMARY OF INVENTION

Technical Problem

However, in conventional technology, there are cases in which a vehicle is not appropriately controlled, and a sense of discomfort is given to a vehicle occupant.

The present invention is in view of such situations, and one object thereof is to provide a vehicle control system, a vehicle control method, and a vehicle control program capable of decreasing a sense of discomfort given to a vehicle occupant.

Solution to Problem

According to an embodiment, a vehicle control system (100) can include: a surrounding state detector (130, 210, 212) configured to detect a state of the surroundings of a subject vehicle; a first running assistor (120) configured to automatically control at least acceleration/deceleration or steering of the subject vehicle such that the subject vehicle can run along a route to a destination by referring to a result of the detection executed by the surrounding state detector; a monitor (250) configured to monitor whether or not the first running assistor is in a predetermined state and limit an operation of the first running assistor in a case in which the first running assistor is in the predetermined state; and a second running assistor (200) configured to assist a vehicle occupant's driving of the subject vehicle on the basis of the result of the detection executed by the surrounding state detector and perform steering control according to a relation between the subject vehicle and a lane in a case in which the first running assistor is determined as being in the predetermined state by the monitor.

In an embodiment, in a case in which the first running assistor is determined as being in the predetermined state by the monitor, the second running assistor is configured to perform assist of driving that can be performed by the second running assistor on the basis of the result of the detection executed by the surrounding state detector among control operations started or control operations planned to be started by the first running assistor at a time point at which the predetermined state is determined.

In an embodiment, in a case in which the first running assistor is determined as being in the predetermined state by the monitor, the second running assistor, in a case in which the subject vehicle is recognized as having moved from a first lane to a second lane on the basis of the result of the detection executed by the surrounding state detector at the time point at which the predetermined state is determined, is configured to control the subject vehicle such that it changes lane to the second lane.

In an embodiment, in a case in which the lane change to the second lane is completed, the second running assistor is configured to control the subject vehicle such that it runs while keeping in the second lane.

In an embodiment, in a case in which the first running assistor is determined as being in the predetermined state by the monitor, the second running assistor, in a case in which the subject vehicle is not recognized as having moved from a first lane to a second lane on the basis of the result of the detection executed by the surrounding state detector at a time point at which the predetermined state is determined, is configured to control the subject vehicle such that it does not change lane to the second lane.

In an embodiment, in a case in which the first running assistor is determined as being in the predetermined state by the monitor, the second running assistor, in a case in which an obstacle is detected in an advancement direction of the subject vehicle by the surrounding state detector, is configured to decelerate or stop the subject vehicle.

In an embodiment, the second running assistor is configured to complete steering control according to a relation between the subject vehicle and a lane until a transition to vehicle control using a vehicle occupant's operation is made from the time point at which the first running assistor is determined as being in the predetermined state by the monitor.

According to another embodiment, a vehicle control system (100) can include: a surrounding state detector (130, 210, 212) configured to detect a state of the surroundings of a subject vehicle; a first running assistor (120) configured to automatically control at least acceleration/deceleration or steering of the subject vehicle such that the subject vehicle can run along a route to a destination by referring to a result of the detection executed by the surrounding state detector; a monitor (250) configured to monitor whether or not the first running assistor is in a predetermined state and limit an operation of the first running assistor in a case in which the first running assistor is in the predetermined state; and a second running assistor (200) configured to assist a vehicle occupant's driving of the subject vehicle on the basis of the result of the detection executed by the surrounding state detector and, in a case in which the first running assistor is determined as being in the predetermined state by the monitor, perform control that can be continued among control operations started or planned to be started by the first running assistor at a time point at which the predetermined state is determined.

According to another embodiment, a vehicle control system (100) can include: a surrounding state detector (130, 210, 212) configured to detect a state of the surroundings of a subject vehicle; a first running assistor (120) configured to automatically control at least steering of the subject vehicle such that the subject vehicle can run along a route to a destination by referring to a result of the detection executed by the surrounding state detector; a monitor (250) configured to monitor whether or not the first running assistor is in a predetermined state and limit an operation of the first running assistor in a case in which the first running assistor is in the predetermined state; and a second running assistor (200) configured to assist a vehicle occupant's driving of the subject vehicle on the basis of the result of the detection executed by the surrounding state detector and, in a case in which the first running assistor is determined as being in the predetermined state by the monitor, perform steering control according to a relation between the subject vehicle and a lane until a transition to vehicle control using a vehicle occupant's operation is made from a time point at which the first running assistor is determined to be in the predetermined state by the monitor.

According to another embodiment, a vehicle control method of using an in-vehicle computer, can include: monitoring whether or not a first running assistor is configured to automatically control at least acceleration/deceleration or steering of a subject vehicle such that the subject vehicle can run along a route to a destination by referring to a result of detection executed by a surrounding state detector is configured to detect a state of the surroundings of the subject vehicle is in a predetermined state and limiting an operation of the first running assistor in a case in which the first running assistor is in the predetermined state; and assisting a vehicle occupant's driving of the subject vehicle on the basis of the result of the detection executed by the surrounding state detector and performing steering control according to a relation between the subject vehicle and a lane in a case in which the first running assistor is determined as being in the predetermined state through the monitoring.

According to another embodiment, a vehicle control program can cause an in-vehicle computer to execute: monitoring whether or not a first running assistor is configured to automatically control at least acceleration/deceleration or steering of a subject vehicle such that the subject vehicle can run along a route to a destination by referring to a result of detection executed by a surrounding state detector is configured to detect a state of the surroundings of the subject vehicle is in a predetermined state and limiting an operation of the first running assistor in a case in which the first running assistor is in the predetermined state; and assisting a vehicle occupant's driving of the subject vehicle on the basis of the result of the detection executed by the surrounding state detector and performing steering control according to a relation between the subject vehicle and a lane in a case in which the first running assistor is determined as being in the predetermined state through the monitoring.

Advantageous Effects of Invention

According to embodiments of the present disclosure, in a case in which a first running assistor is determined as being in a predetermined state by a monitor, a vehicle control system can secure running safety of a subject vehicle by executing steering control according to a relation between the subject vehicle and a lane. As a result, a sense of discomfort given to a vehicle occupant can be reduced.

According to an embodiment of the present disclosure, the vehicle control system can be configured to perform assist of driving that can be performed by the second running assistor on the basis of the result of the detection executed by the surrounding state detector among control operations started or control operations planned to be started by the first running assistor at a time point at which the first running assistor is determined as being in the predetermined state, whereby a sense of discomfort given to a vehicle occupant occurring in accordance with a change of assist at the time point at which the predetermined state is determined can be reduced.

According to an embodiment of the present disclosure, in a case in which the subject vehicle is recognized as having moved from a first lane to a second lane on the basis of the result of the detection executed by the surrounding state detector at a time point at which the first running assistor is determined as being in the predetermined state, the vehicle control system can be configured to control the subject vehicle such that it changes lane to the second lane, whereby a sense of discomfort given to a vehicle occupant can be reduced.

According to an embodiment of the present disclosure, in a case in which the lane change is completed, the vehicle control system can be configured to control the subject vehicle such that it runs while keeping in the second lane, whereby the running safety of the subject vehicle M can be improved.

According to an embodiment of the present disclosure, the lane control system, in a case in which the subject vehicle is not recognized as having moved from a first lane to a second lane on the basis of the result of the detection executed by the surrounding state detector at a time point at which the predetermined state is determined, can be configured to control the subject vehicle such that it does not change lane to the second lane, whereby the running safety of the subject vehicle can be improved.

According to an embodiment of the present disclosure, in a case in which the first running assistor is determined as being in the predetermined state, the vehicle control system, in a case in which an obstacle is detected in an advancement direction of the subject vehicle by the surrounding state detector, can be configured to decelerate or stop the subject vehicle, whereby an interference between the subject vehicle and the obstacle can be prevented. As a result, a sense of discomfort given to a vehicle occupant can be reduced.

According to an embodiment of the present disclosure, the vehicle control system can be configured to complete steering control according to a relation between the subject vehicle and a lane until a transition to vehicle control using a vehicle occupant's operation is made from the time point at which the first running assistor is determined as being in the predetermined state, whereby switching to manual driving can be performed in a state in which the running state of the subject vehicle is stabilized.

According to an embodiment of the present disclosure, the vehicle control system, in a case in which the first running assistor is determined as being in the predetermined state, can be configured to perform control that can be continued among control operations started or control operations planned to be started by the first running assistor at a time point at which the predetermined state is determined, whereby a sense of discomfort given to a vehicle occupant in accordance with the switching of the control when an abnormality occurs can be reduced.

According to an embodiment of the present disclosure, the vehicle control system can be configured to perform steering control according to a relation between the subject vehicle and a lane until a transition to vehicle control using a vehicle occupant's operation is made from a time point at which the first running assistor is determined to be in the predetermined state, whereby a sense of discomfort given to a vehicle occupant in accordance with the switching of the control when an abnormality occurs can be reduced.

DESCRIPTION OF EMBODIMENTS

Hereinafter, a vehicle control system, a vehicle control method, and a vehicle control program according to embodiments of the present invention will be described with reference to the drawings.
<Common Configuration>

Figure 1:
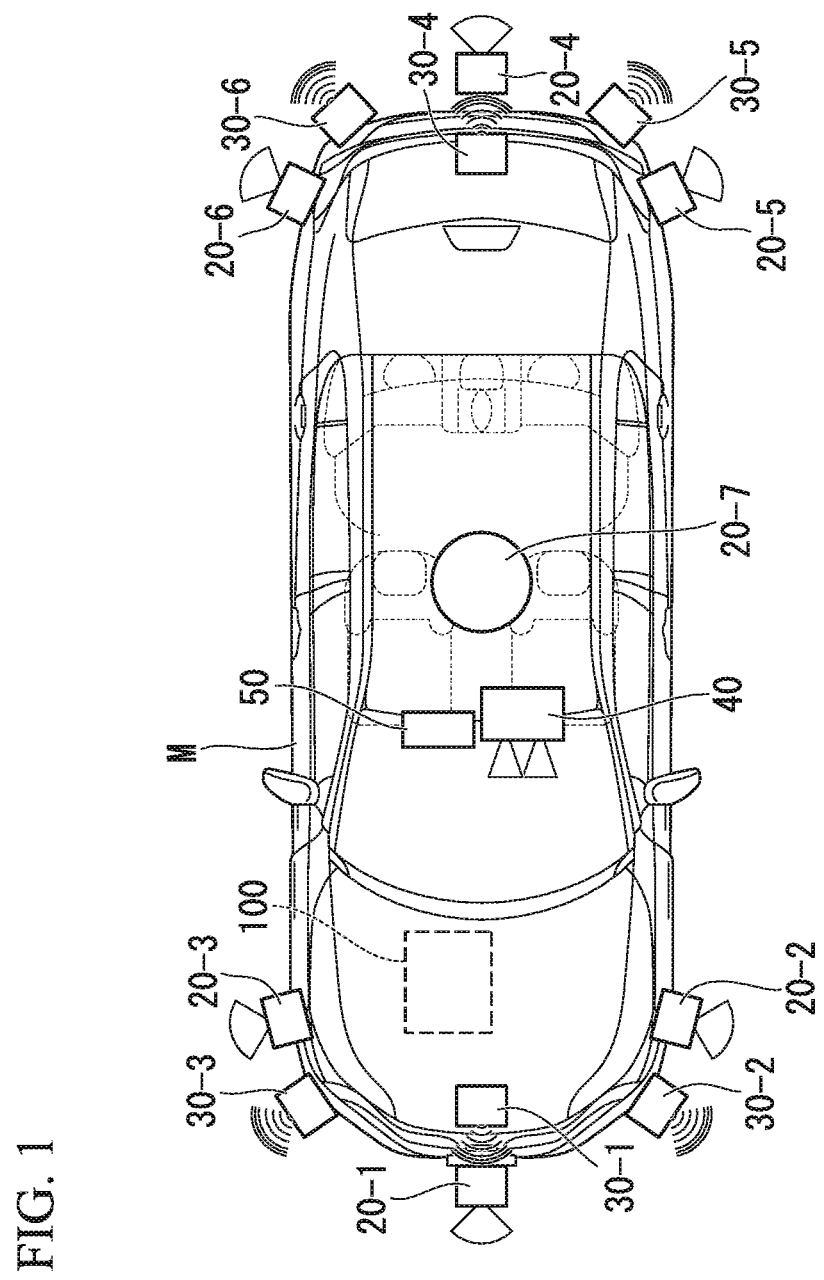
FIG. 1 is a diagram showing constituent elements of a vehicle in which a vehicle control system 100 according to each embodiment is mounted.

FIG. 1 is a diagram showing constituent elements of a vehicle (hereinafter, referred to as a subject vehicle M) in which a vehicle control system 100 according to each embodiment is mounted. A vehicle in which the vehicle control system 100 is mounted, for example, is a vehicle with two wheels, three wheels, four wheels, or the like and includes an automobile having an internal combustion engine such as a diesel engine or a gasoline engine as its power source, an electric vehicle having a motor as its power source, a hybrid vehicle equipped with both an internal combustion engine and a motor, and the like. The electric vehicle described above, for example, is driven using electric power discharged by a cell such as a secondary cell, a hydrogen fuel cell, a metal fuel cell, an alcohol fuel cell, or the like.

As shown in FIG. 1, in the subject vehicle M, sensors such as finders 20-1 to 20-7, radars 30-1 to 30-6, a camera 40 and the like, a navigation device 50, and a vehicle control system 100 are mounted.

Each of the finders 20-1 to 20-7 is a light detection and ranging or a laser imaging detection and ranging (LIDAR) device measuring a distance to a target by measuring scattered light from emitted light. For example, the finder 20-1 is mounted on a front grille or the like, and the finders 20-2 and 20-3 are mounted on side faces of a vehicle body, door mirrors, inside head lights, near side lights, or the like. The finder 20-4 is mounted in a trunk lid or the like, and the finders 20-5 and 20-6 are mounted on side faces of the vehicle body, inside tail lamps or the like. Each of the finders 20-1 to 20-6 described above, for example, has a detection area of about 150 degrees with respect to a horizontal direction. In addition, the finder 20-7 is mounted on a roof or the like. For example, the finder 20-7 has a detection area of 360 degrees with respect to a horizontal direction.

The radars 30-1 and 30-4 described above, for example, are long-distance millimeter wave radars having a wider detection area in a longitudinal direction than that of the other radars. In addition, the radars 30-2, 30-3, 30-5, and 30-6 are middle-distance millimeter wave radars having a narrower detection area in a longitudinal direction than that of the radars 30-1 and 30-4.

Hereinafter, in a case in which the finders 20-1 to 20-7 are not particularly distinguished from each other, one thereof will be simply referred to as a "finder 20", and, in a case in which the radars 30-1 to 30-6 are not to be particularly distinguished from each other, one thereof will be simply referred to as a "radar 30." The radar 30, for example, detects an object using a frequency modulated continuous wave (FM-CW) system.

The camera 40, for example, is a digital camera using a solid-state imaging device such as a charge coupled device (CCD), a complementary metal oxide semiconductor (CMOS), or the like. The camera 40 is mounted in an upper part of a front window shield, a rear face of an interior mirror, or the like. The camera 40, for example, repeats imaging the side in front of the subject vehicle M periodically. The camera 40 may be a stereo camera including a plurality of cameras.

The configuration shown in FIG. 1 is merely one example, and a part of the configuration may be omitted, and other different components may be added.

First Embodiment

Figure 2:
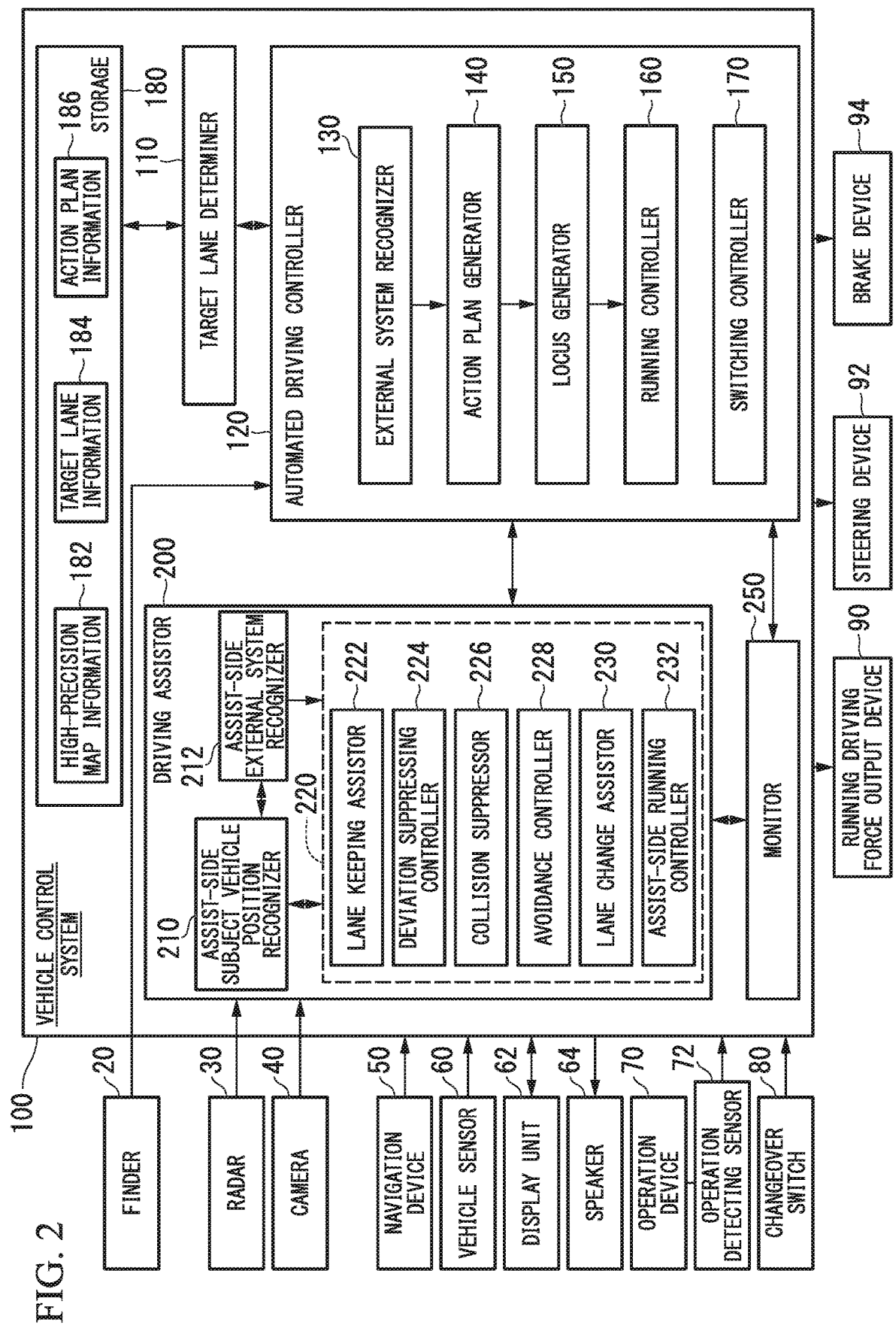
FIG. 2 is a functional configuration diagram of a subject vehicle M in which a vehicle control system 100 according to a first embodiment is mounted.

FIG. 2 is a functional configuration diagram of the subject vehicle M in which a vehicle control system 100 according to a first embodiment is mounted. In the subject vehicle M, in addition to the finders 20, the radars 30, and the camera 40, a navigation device 50, a vehicle sensor 60, a display unit 62, a speaker 64, operation devices (operators) 70 such as an acceleration pedal, a brake pedal, a shift lever (or a paddle shift), a steering wheel, and the like, operation detecting sensors 72 such as an acceleration opening sensor, a brake depression amount sensor (brake switch), a shift position sensor, a steering angle sensor (or a steering torque sensor), and the like, a changeover switch 80, a running driving force output device 90, a steering device 92, a brake device 94, and a vehicle control system 100 are mounted. Such devices and units are interconnected through a multiple-communication line such as a controller area network (CAN), a serial communication line, a radio communication network, or the like. The operation devices shown as an example are merely examples, and a joystick, buttons, a dial switch, a graphic user interface (GUI) switch, or the like may be mounted in the subject vehicle M. In addition, a vehicle control system according to the claims may include not only the vehicle control system 100 but also components (the finder 20 and the like) other than the vehicle control system 100 included in the configuration shown in FIG. 2.

The navigation device 50 includes a global navigation satellite system (GNSS) receiver and map information (navigation map), a touch panel-type display device functioning as a user interface, a speaker, a microphone, and the like. The navigation device 50 identifies a location of the subject vehicle M using the GNSS receiver and derives a route from the location to a destination designated by a user. A route derived by the navigation device 50 is provided for a target lane determiner 110 of the vehicle control system 100. The location of the subject vehicle M may be identified or complemented by an inertial navigation system (INS) using an output of the vehicle sensor 60. In addition, when the vehicle control system 100 operates in a manual drive mode, the navigation device 50 performs guidance using speech or a navigation display for a route to the destination. Components used for identifying the location of the subject vehicle M may be disposed to be independent from the navigation device 50. In addition, the navigation device 50, for example, may be realized by one function of a terminal device such as a smartphone, a tablet terminal, or the like held by a user. In such a case, information is transmitted and received using wireless or wired communication between the terminal device and the vehicle control system 100.

The vehicle sensor 60 includes a vehicle speed sensor detecting a vehicle speed, an acceleration sensor detecting an acceleration, a yaw rate sensor detecting an angular velocity around a vertical axis, an azimuth sensor detecting the azimuth of the subject vehicle M, and the like.

The display unit 62 displays information as an image. The display unit 62, for example, includes a liquid crystal display (LCD), an organic electroluminescence (EL) display device, a head-up display, or the like. In addition, the display unit 62 may be a display unit included in the navigation device 50 or a display unit of an instrument panel displaying a state (a speed and the like) of the subject vehicle M. The speaker 64 outputs information as speech.

The operation detecting sensor 72 outputs an accelerator opening degree, a brake depression amount, a shift position, a steering angle, a steering torque, and the like to the vehicle control system 100 as results of detection. Instead of this, the results of detection acquired by the operation detecting sensors 72 may be directly output to the running driving force output device 90, the steering device 92, or the brake device 94 depending on a drive mode.

The changeover switch 80 is a switch that is operated by a vehicle occupant. The changeover switch 80 receives an operation of a vehicle occupant, generates a drive mode designation signal designating a drive mode of the subject vehicle M, and outputs the generated drive mode designation signal to the switching controller 170. The changeover switch 80 may be any one of a graphical user interface (GUI) switch and a mechanical switch.

The running driving force output device 90 outputs a running driving force (torque) used for running the vehicle to driving wheels. For example, the running driving force output device 90 includes an engine, a transmission, and an engine control unit (ECU) controlling the engine in a case in which the subject vehicle M is an automobile having an internal combustion engine as its power source, includes a running motor and a motor ECU controlling the running motor in a case in which the subject vehicle M is an electric vehicle having a motor as its power source, and includes an engine, a transmission, an engine ECU, a running motor, and a motor ECU in a case in which the subject vehicle M is a hybrid vehicle. In a case in which the running driving force output device 90 includes only an engine, the engine ECU adjusts a throttle opening degree, a shift level, and the like of the engine in accordance with information input from a running controller 160 to be described later. On the other hand, in a case in which the running driving force output device 90 includes only a running motor, the motor ECU adjusts a duty ratio of a PWM signal given to the running motor in accordance with information input from the running controller 160. In a case in which the running driving force output device 90 includes an engine and a running motor, an engine ECU and a motor ECU control a running driving force in cooperation with each other in accordance with information input from the running controller 160.

The steering device 92, for example, includes a steering ECU and an electric motor. The electric motor, for example, changes the direction of a steering wheel by applying a force to a rack and pinion mechanism. The steering ECU changes the direction of the steering wheels by driving the electric motor in accordance with information input from the vehicle control system 100 or information of a steering angle or a steering torque that is input.

The brake device 94, for example, is an electric servo brake device including a brake caliper, a cylinder delivering hydraulic pressure to the brake caliper, an electric motor generating hydraulic pressure in the cylinder, and a brake control unit. The brake control unit of the electric servo brake device performs control of the electric motor in accordance with information input from the running controller 160 such that brake torque according to a braking operation is output to each vehicle wheel. The electric servo brake device may include a mechanism delivering hydraulic pressure generated by an operation of the brake pedal to the cylinder through a master cylinder as a backup. In addition, the brake device 94 is not limited to the electric servo brake device described above and may be an electronic control-type hydraulic brake device. The electronic control-type hydraulic brake device delivers hydraulic pressure of the master cylinder to the cylinder by controlling an actuator in accordance with information input from the running controller 160. In addition, the brake device 94 may include a regenerative brake using the running motor included in the running driving force output device 90.

[Vehicle Control System]

Hereinafter, the vehicle control system 100 will be described. The vehicle control system 100, for example, is realized by one or more processors or hardware having functions equivalent thereto. The vehicle control system 100 may be configured by combining an electronic control unit (ECU), a micro-processing unit (MPU), or the like in which a processor such as a central processing unit (CPU), a storage device, and a communication interface are interconnected through an internal bus.

The vehicle control system 100, for example, includes a target lane determiner 110, an automated driving controller (first running assistor) 120, a storage 180, a driving assistor (second running assistor) 200, and a monitor 250. Each of the target lane determiner 110, the automated driving controller 120, the driving assistor 200, and the monitor 250, for example, is realized by executing a program using a dedicated processor or hardware such as a large scale integration (LSI), an application specific integrated circuit (ASIC), or a field-programmable gate array (FPGA). In addition, by appropriately integrating such constituent elements, a plurality of constituent elements may be realized by one processor. For example, the driving assistor 200 and the monitor 250 may be realized by one processor executing multithread processing. The constituent elements described above can mutually transmit/receive information through a communication line, a radio network, or the like. Hereinafter, the driving assistor 200 will be described first, and next, the automated driving controller 120 and the like will be described.

[Driving Assistor 200]

The driving assistor 200 includes an assist-side subject vehicle position recognizer 210, an assist-side external system recognizer 212, and an assist controller 220. A part or all of the functional units of the assist-side subject vehicle position recognizer 210, the assist-side external system recognizer 212, and the assist controller 220 may be realized by a processor executing a program (software). In addition, a part or all of these may be realized by hardware such as an LSI, an ASIC, or FPGA or may be realized by combining software and hardware. The driving assistor 200 is a functional unit having a lower degree of automated driving than the automated driving controller 120. In other words, in the driving assistor 200, there is no function such as the function of the action plan generator 140, and, when the driving assistor 200 executes handover in a case in which the automated driving controller 120 to be described later is in a predetermined state, only a function that can be assisted by the driving assistor 200 is realized.

The assist-side subject vehicle position recognizer 210 of the driving assistor 200 recognizes a lane (running lane) in which the subject vehicle M runs and a relative position of the subject vehicle M with respect to the running lane on the basis of information input from the radar 30, the camera 40, or the vehicle sensor 60.

Figure 3:
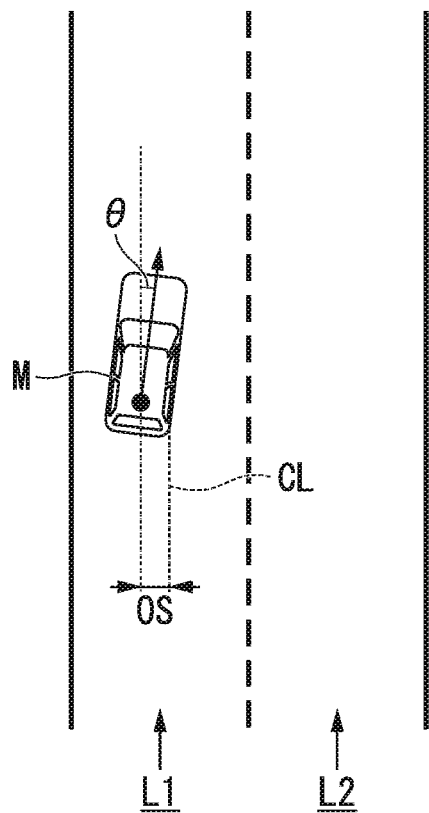
FIG. 3 is a diagram showing a view in which a relative position of the subject vehicle M with respect to a running lane L1 is recognized by a subject vehicle position recognizer 122.

FIG. 3 is a diagram showing a view in which a relative position of the subject vehicle M with respect to a running lane L1 is recognized by the assist-side subject vehicle position recognizer 210. For example, the assist-side subject vehicle position recognizer 210 recognizes an offset OS of a reference point (for example, the center of gravity) of the subject vehicle M from the center CL of the running lane and an angle θ of an advancement direction of the subject vehicle M formed with respect to a line along the center CL of the running lane as a relative position of the subject vehicle M with respect to the running lane L1. In addition, instead of this, the assist-side subject vehicle position recognizer 210 may recognize a position of the reference point of the subject vehicle M with respect to a side end part of the own lane L1 and the like as a relative position of the subject vehicle M with respect to the running lane. The relative position of the subject vehicle M recognized by a subject vehicle position recognizer 122 is provided for the target lane determiner 110 to be described later.

The assist-side external system recognizer 212 recognizes states of a surrounding vehicle such as a position, a speed, an acceleration, and the like on the basis of information input from the radar 30, the camera 40, and the like. For example, a surrounding vehicle is a vehicle running in the vicinity of the subject vehicle M and is a vehicle running in the same direction as that of the subject vehicle M. The position of a surrounding vehicle may be represented as a representative point on another vehicle such as the center of gravity, a corner, or the like and may be represented by an area represented by the contour of another vehicle. The "state" of a surrounding vehicle may include an acceleration of a surrounding vehicle and whether a lane is being changed (or whether a lane is to be changed or not) on the basis of information of various devices described above. In addition, the external system recognizer 130 may recognize positions of a guard rail and a telegraph pole, a parked vehicle, a pedestrian, and other objects in addition to the surrounding vehicles.

The assist controller 220, for example, includes a lane keeping assistor 222, a deviation suppressing controller 224, a collision suppressor 226, an avoidance controller 228, a lane change assistor 230, and an assist-side running controller 232.

Some or all of the lane keeping assistor 222, the deviation suppressing controller 224, the collision suppressor 226, the avoidance controller 228, the lane change assistor 230, the assist-side running controller 232 may execute a process in parallel with the process of the automated driving controller 120 even in a case in which the subject vehicle M is automatically driven.

The lane keeping assistor 222 performs control of the behavior of the subject vehicle M such that the subject vehicle M runs along a running lane. The lane keeping assistor 222 realizes a so-called lane keeping assist system (LKAS). The lane keeping assistor 222, for example, sets a center line of a running lane from dividing lines of a running lane detected by the assist-side subject vehicle position recognizer 210, calculates a curvature of a running route reaching a predetermined viewpoint set along the center line of the running lane, and calculates a horizontal deviation amount from the center line of the running lane. The lane keeping assistor 222 determines information of a steering angle or a steering torque for causing the subject vehicle M to run along the lane on the basis of the curvature and the horizontal deviation amount that have been calculated. The lane keeping assistor 222 outputs the information of the steering angle or the steering torque that has been determined to the assist-side running controller 232, thereby assisting the driving of a vehicle occupant such that the subject vehicle M runs along the lane.

The deviation suppressing controller 224 performs control of the behavior of the subject vehicle M such that the subject vehicle M runs without departing from the running lane. The deviation suppressing controller 224 realizes a so-called a road departure mitigation (RDM) system. For example, in a case in which the degree of deviation of the subject vehicle M from a dividing line of the running lane detected by the assist-side subject vehicle position recognizer 210 becomes a predetermined degree (a first degree), the deviation suppressing controller 224 draws the attention of the vehicle occupant by displaying information representing that the subject vehicle M approaches the dividing line on the display unit 62, causing the speaker 64 to output the information, or vibrating the steering of the subject vehicle M and determines information of a steering angle or a steering torque for returning the subject vehicle M to the center of the lane.

Then, the deviation suppressing controller 224 outputs the information of the steering angle or the steering torque that has been determined to the assist-side running controller 232, thereby assisting the driving of the vehicle occupant such that the subject vehicle M is returned to the center of the running lane. The degree of deviation is a degree representing a derived likelihood of the subject vehicle M deviating from the dividing line on the basis of a horizontal movement amount of the subject vehicle M, a distance between the subject vehicle M and the dividing line, a speed of the subject vehicle M, and the like.

In addition, for example, in a case in which the degree of deviation of the subject vehicle M from the running lane detected by the assist-side subject vehicle position recognizer 210 becomes a predetermined degree (a second degree higher than the first degree) or in a case in which the subject vehicle M deviates from the dividing line, the deviation suppressing controller 224 suppresses a deviation of the subject vehicle M from the dividing line by controlling the brake device 94 and performs control of the steering device 92 such that the subject vehicle M is returned to the center of the lane.

In a case in which a surrounding vehicle running in an adjacent lane adjacent to the running lane is detected by the assist-side external system recognizer 212, the collision suppressor 226 performs control of the behavior of the subject vehicle M such that the subject vehicle M does not approach the surrounding vehicle by protruding from the running lane. The collision suppressor 226 performs a process in a case in which a surrounding vehicle is detected and thus performs control at a timing earlier than a timing at which control using the deviation suppressing controller 224 is started.

For example, in a case in which the subject vehicle M runs in a plurality of lanes of which advancement directions are the same, the collision suppressor 226 estimates a vehicle occupant's intention of lane change. For example, the collision suppressor 226 may estimate that a vehicle occupant has an intention of lane change to the right side in a case in which a direction indicator lever is operated by the vehicle occupant such that a direction indicator disposed on the right side of the subject vehicle M is turned on and estimate that a vehicle occupant has an intention of lane change to the left side in a case in which a direction indicator lever is operated by the vehicle occupant such that a direction indicator disposed on the left side of the subject vehicle M is turned on. In addition, the collision suppressor 226 may estimate an intention of lane change of the subject vehicle M on the basis of a running locus of the subject vehicle M.

When a surrounding vehicle having a likelihood of interfering with the subject vehicle M in a case in which the subject vehicle M changes the lane to a lane disposed in a direction in which the intention of lane change has been estimated, and the degree of deviation of the subject vehicle M becomes a predetermined degree, the collision suppressor 226 calls attention of the vehicle occupant by displaying information representing that the subject vehicle M is close to the dividing line on the display unit 62, causing the speaker 64 to output the information, or vibrating the steering of the subject vehicle M and determines information of a steering angle or a steering torque such that the subject vehicle M is returned to the center of the lane. The collision suppressor 226 outputs the determined information of the steering angle or the steering torque to the assist-side running controller 232, thereby returning the subject vehicle M to the center of the running lane. In this way, the collision suppressor 226 controls the subject vehicle M on the basis of a result of the estimation of the intention of lane change in a case in which a surrounding vehicle is present.

In a case in which an obstacle is recognized by the assist-side external system recognizer 212, the avoidance controller 228 controls the subject vehicle M to avoid an interference between the subject vehicle M and the obstacle. The avoidance controller 228 realizes a so-called collision mitigation brake system (CMBS). The avoidance controller 228 controls output of a warning sound using the speaker 64, drawing of a safety belt, control of the steering device 92, and control of the brake device 94 on the basis of a result of recognition of the assist-side external system recognizer 212, thereby controlling the subject vehicle M not to interfere with an obstacle.

The lane change assistor 230 generates a locus for performing lane change on the basis of a result of the recognition using the assist-side subject vehicle position recognizer 210 and a result of the recognition using the assist-side external system recognizer 212. In a case in which a surrounding vehicle is not present in the vicinity of the subject vehicle M, the lane change assistor 230 determines a position and a state in which the lane change is completed in a lane of a lane change destination on the basis of the current position and the current state (a vehicle speed or an acceleration) of the subject vehicle M and generates a locus for performing the lane change on the basis of the position and the state that have been determined.

On the other hand, in a case in which a surrounding vehicle is present in the vicinity of the subject vehicle M, the lane change assistor 230 predicts a displacement of a position of the surrounding vehicle in the future using a predetermined speed model. The lane change assistor 230 generates a locus for lane change without the subject vehicle M interfering with a surrounding vehicle on the basis of a result of the recognition using the assist-side subject vehicle position recognizer 210, a result of the recognition using the external system recognizer 212, and the predetermined speed model.

The lane change assistor 230, for example, has functions equivalent to those of a locus candidate generator 154, an evaluation selector 156, and a lane change controller 158 to be described later. In addition, a lane change switch operated by a driver or the like may be disposed in the subject vehicle M. The lane change switch receives an operation of a driver or the like, generates a control mode designation signal used for designating one of an automated lane change mode and a manual drive mode as a control mode using the assist-side running controller 232, and outputs the generated control mode designation signal to the assist-side running assistor 232. The automated lane change mode is a mode in which the subject vehicle M automatically changes the lane in accordance with the control of the lane change assistor 230.

The assist-side running controller 232 acquires a process result of the lane keeping assistor 222, the deviation suppressing controller 224, the collision suppressor 226, the avoidance controller 228, or the lane change assistor 230 and controls the running driving force output device 90, the steering device 92, the brake device 94, and the amount of operation of the acceleration pedal such that the subject vehicle M runs in accordance with the acquired process result.

The monitor 250 monitors whether or not the automated driving controller 120 is in a predetermined state and limits the operation of the automated driving controller 120 in a case in which the automated driving controller 120 is in the predetermined state.

[Automated Driving Controller 120]

The automated driving controller 120, for example, includes a subject vehicle position recognizer 122, an external system recognizer 130, an action plan generator 140, a locus generator 150, a running controller 160, and a switching controller 170.

In the storage 180, for example, information such as high-precision map information 182, target lane information 184, action plan information 186, and the like is stored. The storage 180 is realized by a read only memory (ROM), a random access memory (RAM), a hard disk drive (HDD), a flash memory, or the like. A program executed by the processor may be stored in the storage 180 in advance or may be downloaded from an external device through in-vehicle internet facilities or the like. In addition, a program may be installed in the storage 180 by mounting a portable-type storage medium storing the program in a drive device not shown in the drawing. Furthermore, the vehicle control system 100 may be distributed in a plurality of computer devices.

The target lane determiner 110, for example, is realized by an MPU. The target lane determiner 110 divides a route provided from the navigation device 50 into a plurality of blocks (for example, divides the route for every 100 [m] in the vehicle advancement direction) and determines a target lane for each block by referring to the high-precision map information 182. The target lane determiner 110, for example, determines a lane, in which the subject vehicle runs, represented using a position from the left side. For example, in a case in which a branching place, a merging place, or the like is present in the route, the target lane determiner 110 determines a target lane such that the subject vehicle M can run in a running route that is rational for advancing to a branching destination. The target lane determined by the target lane determiner 110 is stored in the storage 180 as target lane information 184.

The high-precision map information 182 is a map information having higher precision than that navigation map included in the navigation device 50. The high-precision map information 182, for example, includes information of the center of a lane or information of boundaries of a lane and the like. In addition, in the high-precision map information 182, road information, traffic regulation information, address information (an address and a zip code), facility information, telephone number information, and the like may be included. In the road information, information representing a type of road such as an expressway, a toll road, a national road, or a prefectural road and information such as the number of lanes of a road, a width of each lane, a gradient of a road, a curvature of the curve of a lane, locations of merging and branching points of lanes, a sign installed on a road, and the like are included. In the traffic regulation information, information of closure of a lane due to a roadwork, a traffic accident, congestion, or the like is included.

The external system recognizer 130 recognizes states of surrounding vehicles such as positions, speeds, accelerations, and the like on the basis of information input from the finder 20. In addition, the external system recognizer 130 may recognize positions of a guard rail and a telegraph pole, a parked vehicle, a pedestrian, and other objects in addition to the surrounding vehicles. Furthermore, the external system recognizer 130 may recognize the positions of surrounding vehicles and the like by integrating the information input from the finder 20 and information input from the radar 30 or the camera 40. The external system recognizer 130 acquires the information input from the radar 30 or the camera 40 through the driving assistor 200. In addition, the external system recognizer 130 may acquire a result of the process using the driving assistor 200. A result of the process is a result acquired by processing the information input from the radar 30 or the camera 40 using the driving assistor 200.

The action plan generator 140 sets a start place of automated driving and/or a destination of automated driving. The start place of the automated driving may be a current position of the subject vehicle M or may be a place at which an operation for directing automated driving is performed. The action plan generator 140 generates an action plan in a section between the start place and the destination of the automated driving. In addition, the action plan is not limited to this, and the action plan generator 140 may generate an action plan for an arbitrary section.

The action plan, for example, is configured of a plurality of events that are sequentially executed. The events, for example, include a deceleration event of decelerating the subject vehicle M, an acceleration event of accelerating the subject vehicle M, a lane keeping event of causing the subject vehicle M to run without deviating from a running lane, a lane changing event of changing a running lane, an overtaking event of causing the subject vehicle M to outrun a vehicle running ahead, a branching event of changing a lane to a desired lane at a branching point or causing the subject vehicle M to run without deviating from a current running lane, a merging event of accelerating/decelerating the subject vehicle M and changing a running lane in a merging lane for merging into a main lane, and the like. The action plan generator 140 sets a lane changing event, a branching event, or a merging event at a place at which a target lane determined by the target lane determiner 110 is changed. Information representing the action plan generated by the action plan generator 140 is stored in the storage 180 as action plan information 186.

Figure 4:
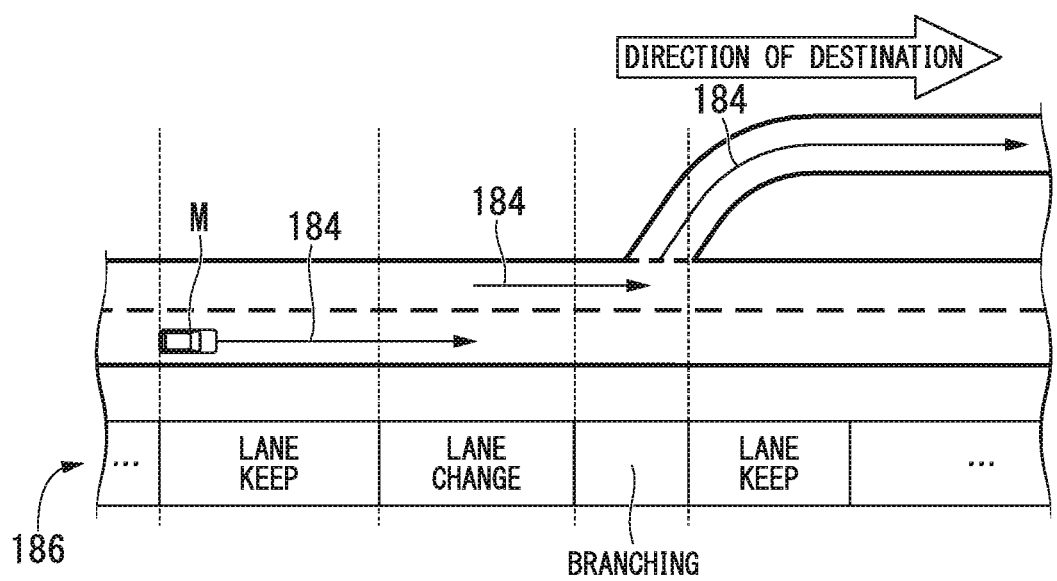
FIG. 4 is a diagram showing one example of an action plan generated for a certain section.

FIG. 4 is a diagram showing one example of an action plan generated for a certain section. As shown in the drawing, the action plan generator 140 generates an action plan that is necessary for the subject vehicle M to run on a target lane indicated by the target lane information 184. In addition, the action plan generator 140 may dynamically change the action plan in accordance with a change in the status of the subject vehicle M regardless of the target lane information 184. For example, in a case in which a speed of a surrounding vehicle recognized during the running of the vehicle by the external system recognizer 130 exceeds a threshold, or a moving direction of a surrounding vehicle running on a lane adjacent to the own lane (running lane) is directed toward the direction of the own lane, the action plan generator 140 changes the event set in a driving section on which the subject vehicle M plans to run. For example, in a case in which an event is set such that the lane changing event is executed after the lane keeping event, when it is determined that a vehicle runs at a speed that is a threshold or more from the rear side of a lane that is a lane change destination during the lane keeping event in accordance with a result of the recognition of the external system recognizer 130, the action plan generator 140 changes the next event next of a lane keeping event from a lane changing event to a deceleration event, a lane keeping event, or the like. As a result, also in a case in which a change in the state of the external system occurs, the vehicle control system 100 can cause the subject vehicle M to safely run automatically.

Figure 5:
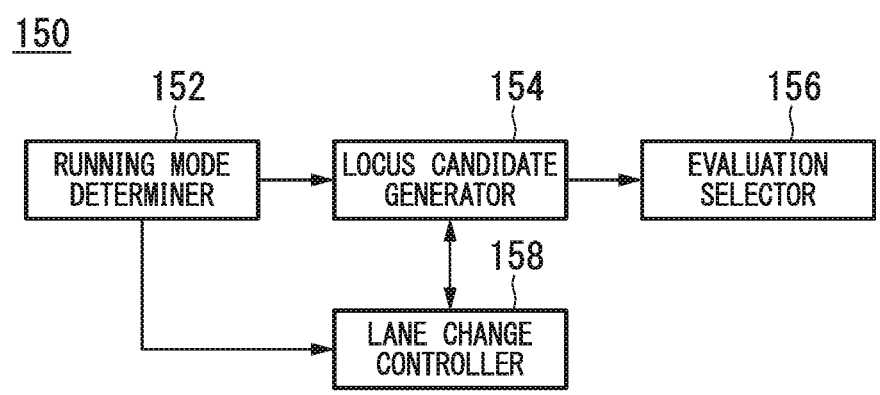
FIG. 5 is one example of the configuration of a locus generator 150.

FIG. 5 is one example of the configuration of the locus generator 150. The locus generator 150, for example, includes a running mode determiner 152, a locus candidate generator 154, an evaluation selector 156, and a lane change controller 158.

When the lane keeping event is executed, the running mode determiner 152 determines one running mode among constant-speed running, following running, decelerated running, curve running, obstacle avoidance running, and the like. For example, in a case in which another vehicle is not present in front of the subject vehicle M, the running mode determiner 152 determines constant-speed running as the running mode. In addition, in a case in which following running for a vehicle running ahead is to be executed, the running mode determiner 152 determines following running as the running mode. Furthermore, in a case in which deceleration of a vehicle running ahead is recognized by the external system recognizer 130 or in a case in which an event of stopping, parking, or the like is to be executed, the running mode determiner 152 determines the decelerated running as the running mode. In addition, in a case in which the subject vehicle M is recognized to have reached a curved road by the external system recognizer 130, the running mode determiner 152 determines the curve running as the running mode. Furthermore, in a case in which an obstacle is recognized in front of the subject vehicle M by the external system recognizer 130, the running mode determiner 152 determines the obstacle avoidance running as the running mode.

The locus candidate generator 154 generates candidates of a locus on the basis of the running mode determined by the running mode determiner 152. In this embodiment, a locus is a set of target positions (locus points) at which the reference position (for example, the center of gravity or the center of a rear wheel shaft) of the subject vehicle M is assumed to arrive for every predetermined time in the future (or for every predetermined running distance). The locus candidate generator 154 at least calculates a target speed of the subject vehicle M on the basis of a speed of a target OB present in front of the subject vehicle M recognized by the external system recognizer 130 and a distance between the subject vehicle M and the target OB. The locus candidate generator 154 generates one or more locus on the basis of the calculated target speed. Here, the target OB includes a vehicle running ahead, places such as a merging place, a branching place, a target place, and the like, an object such as an obstacle, and the like.

Figure 6:
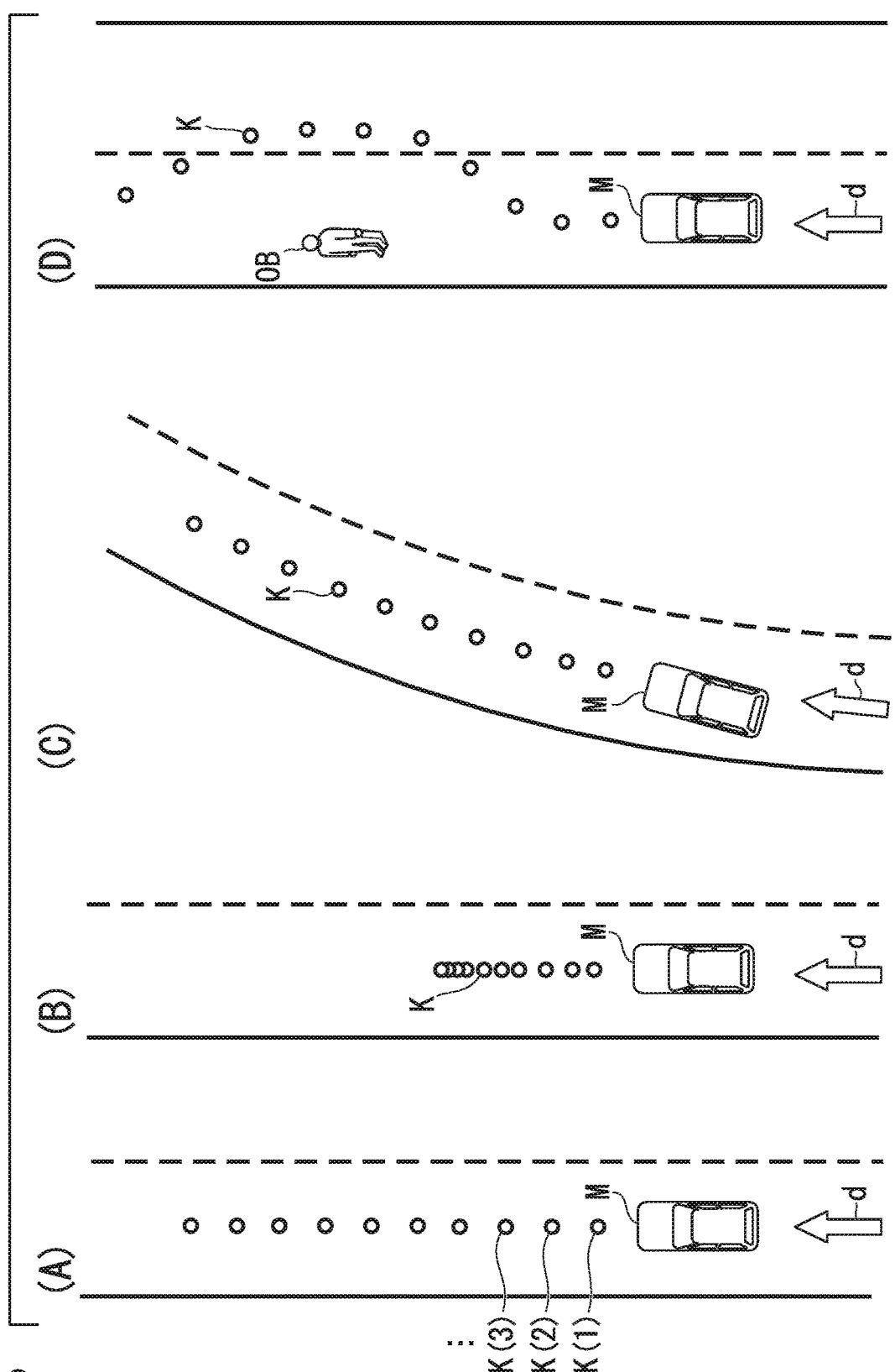
FIG. 6 is a diagram showing one example of candidates for a locus that are generated by a locus candidate generator 154.

FIG. 6 is a diagram showing one example of candidates for a locus that are generated by the locus candidate generator 154. In this drawing and in FIG. 9 to be described later, among a plurality of candidates of a locus that may be set, only a representative locus or a locus selected by the evaluation selector 156 is represented and will be described. In the drawing, as shown in (A), for example, the locus candidate generator 154 sets locus points K(1), K(2), K(3), . . . with respect to the current position of the subject vehicle M as a reference every time when a predetermined time Δt elapses from the current time. Hereinafter, in a case in which such locus positions are not distinguished from each other, they may be simply referred to as "locus point K."

For example, in a case in which the constant-speed running is determined as the running mode by the running mode determiner 152, the locus candidate generator 154, as shown in (A) in the drawing, sets a plurality of locus points at uniform intervals. In a case in which such a simple locus is generated, the locus candidate generator 154 may generate only one locus.

In addition, in a case in which the decelerated running is determined as the running mode by the running mode determiner 152 (including a case in which a vehicle running ahead decelerates in the following running), the locus candidate generator 154, as shown in (B) in the drawing, generates a locus by increasing the space for a locus point K at which the arrival time is earlier and decreases the space for a locus point K at which the arrival time is later. In such a case, there are cases in which a vehicle running ahead is set as a target OB, or a place such as a merging place, a branching place, a target place, or the like, an obstacle, or the like other than the vehicle running ahead is set as a target OB. Accordingly, a locus point K at which arrival time of the subject vehicle M is late becomes close to the current position of the subject vehicle M, and thus, the running controller 160 to be described later decelerates the subject vehicle M.

In addition, in a case in which the curve running is determined as the running mode by the running mode determiner 152, as shown in (C) in the drawing, the locus candidate generator 154 arranges a plurality of locus points K with a horizontal position (a position in the horizontal direction of the lane) changed with respect to the advancement direction of the subject vehicle M in accordance with the curvature of the road. Furthermore, as shown in (D) in the drawing, in a case in which an obstacle OB such as a person, a stopped vehicle, or the like is present on the road in front of the subject vehicle M, the locus candidate generator 154 arranges a plurality of locus points K such that the subject vehicle runs with this obstacle OB avoided.

The evaluation selector 156 evaluates the candidates of the locus generated by the locus candidate generator 154, for example, from two viewpoints of planning and safety and selects a locus to be output to the running controller 160. From the viewpoint of planning, for example, in a case in which a locus has high followability to a plan that has already been generated (for example, an action plan), and a total length of the locus is short, the locus is evaluated as being high. For example, in a case in which it is preferable to change lane to the right side, a locus in which the lane is changed to the left side and is returned has a low evaluation. From the viewpoint of safety, for example, a locus is evaluated as being high when a distance between the subject vehicle M and an object (a surrounding vehicle or the like) is longer, and the amount of change in acceleration/deceleration, a steering angle, or the like is smaller.

Figure 7:
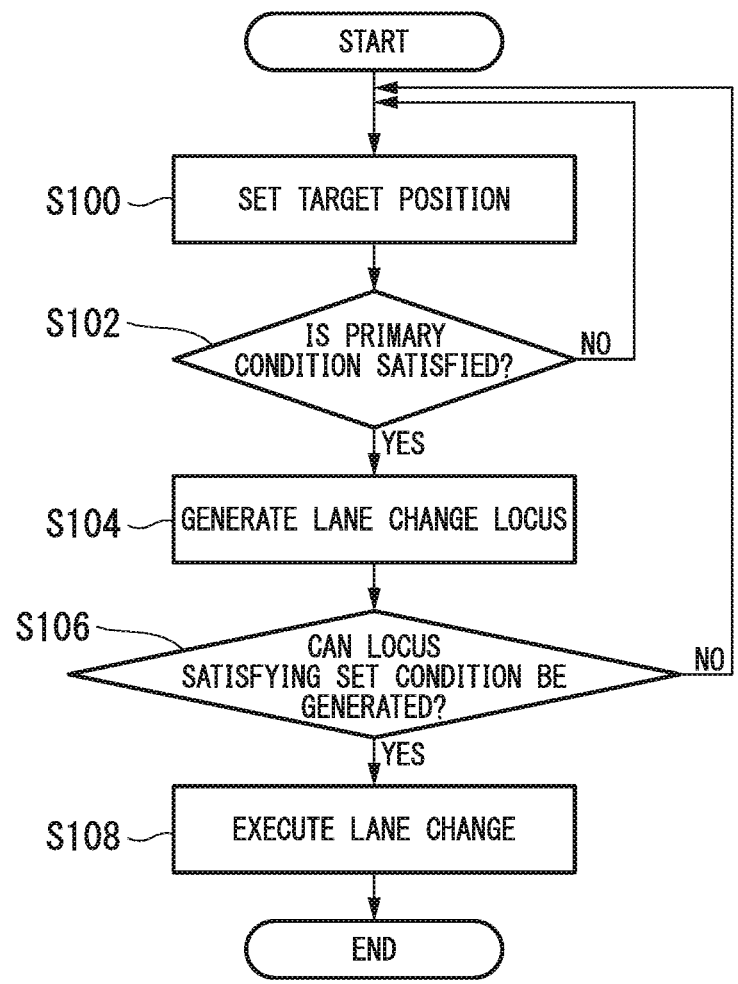
FIG. 7 is a flowchart showing one example of the flow of a process executed in a case in which a lane changing event is executed.

The lane change controller 158 operates in a case in which the lane changing event, the branching event, the merging event, or the like is executed, in other words, in a case in which the lane is changed in a broad sense. FIG. 7 is a flowchart showing one example of the flow of a process executed in a case in which the lane changing event is executed. The process will be described with reference with this drawing and FIG. 8.

First, the lane change controller 158 selects two surrounding vehicles from surrounding vehicles running in adjacent lanes that are adjacent to a lane (own lane) in which the subject vehicle M runs and are adjacent lanes of a lane change destination and sets a target position TA between such surrounding vehicles (Step S100). Hereinafter, in description, a surrounding vehicle running immediately before the target position TA in an adjacent lane will be referred to as a front reference vehicle mB, and a surrounding vehicle running immediately after the target position TA in an adjacent lane will be referred to as a back reference vehicle mC. The target position TA is a relative position based on positional relations between the subject vehicle M and the front reference vehicle mB and the back reference vehicle mC.

Figure 8:
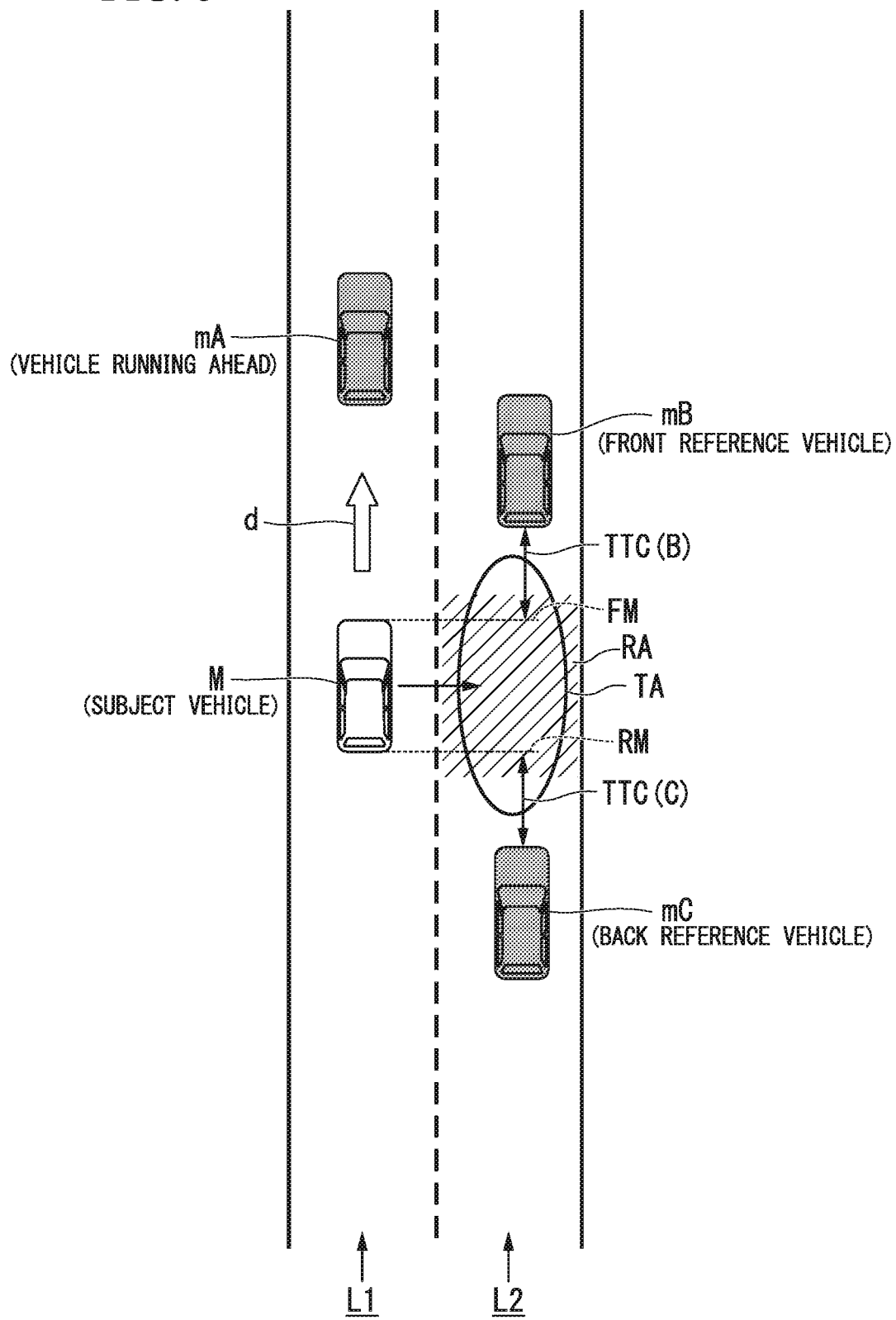
FIG. 8 is a diagram showing a view in which a target position TA is set.

FIG. 8 is a diagram showing a view in which the target position TA is set. In the drawing, mA represents a vehicle running ahead, mB represents the front reference vehicle, and mC represents the back reference vehicle. In addition, an arrow d represents an advancement (running) direction of the subject vehicle M, L1 represents the own lane, and L2 represents an adjacent lane. In the case of the example shown in FIG. 8, the lane change controller 158 sets a target position TA on the adjacent lane L2 between the front reference vehicle mB and the back reference vehicle mC.

Next, the lane change controller 158 determines whether or not a primary condition used for determining whether or not a lane change to the target position TA (in other words, between the front reference vehicle mB and the back reference vehicle mC) is satisfied (Step S102).

The primary condition, for example, is that at least a part of a surrounding vehicle is not present in a prohibition area RA disposed in an adjacent lane, and a time-to-collision (TTC) between the subject vehicle M and each of the front reference vehicle mB and the back reference vehicle mC is larger than a threshold. This determination condition is one example of a case in which the target position TA is set on the lateral side of the subject vehicle M. In a case in which the primary condition is not satisfied, the lane change controller 158 returns the process to Step S100 and resets the target position TA. At this time, standby up to a timing at which a target position TA satisfying the primary condition can be set may be performed, or the target position TA may be changed, and speed control for moving to the lateral side of the target position TA may be performed.

As shown in FIG. 8, the lane change controller 158, for example, projects the subject vehicle M to an adjacent lane L2 that is a lane of a lane change destination and sets the prohibition area RA keeping a slight marginal distance before and after the projected subject vehicle M. The prohibition area RA is set as an area extending from one end of the adjacent lane L2 in the horizontal direction to the other end.

In a case in which a surrounding vehicle is not present inside the prohibition area RA, the lane change controller 158, for example, assumes an extended line FM and an extended line RM acquired by virtually extending a front end and a rear end of the subject vehicle M to the side of the lane L2 that is the lane change destination. The lane change controller 158 calculates a time-to-collision TTC(B) of the extended line FM and the front reference vehicle mB and a rear side reference vehicle TTC(C) of the extended line RM and the back reference vehicle mC. The time-to-collision TTC(B) is a time derived by dividing a distance between the extended line FM and the front reference vehicle mB by a relative speed between the subject vehicle M and the front reference vehicle mB. The time-to-collision TTC(C) is a time derived by dividing a distance between the extended line RM and the back reference vehicle mC by a relative speed between the subject vehicle M and the back reference vehicle mC. The lane change controller 158 determines that the primary condition is satisfied in a case in which the time-to-collision TTC(B) is larger than a threshold Th(B), and the time-to-collision TTC(C) is larger than a threshold Th(C). The thresholds Th(B) and Th(C) may have the same values or different values.

Figure 9:
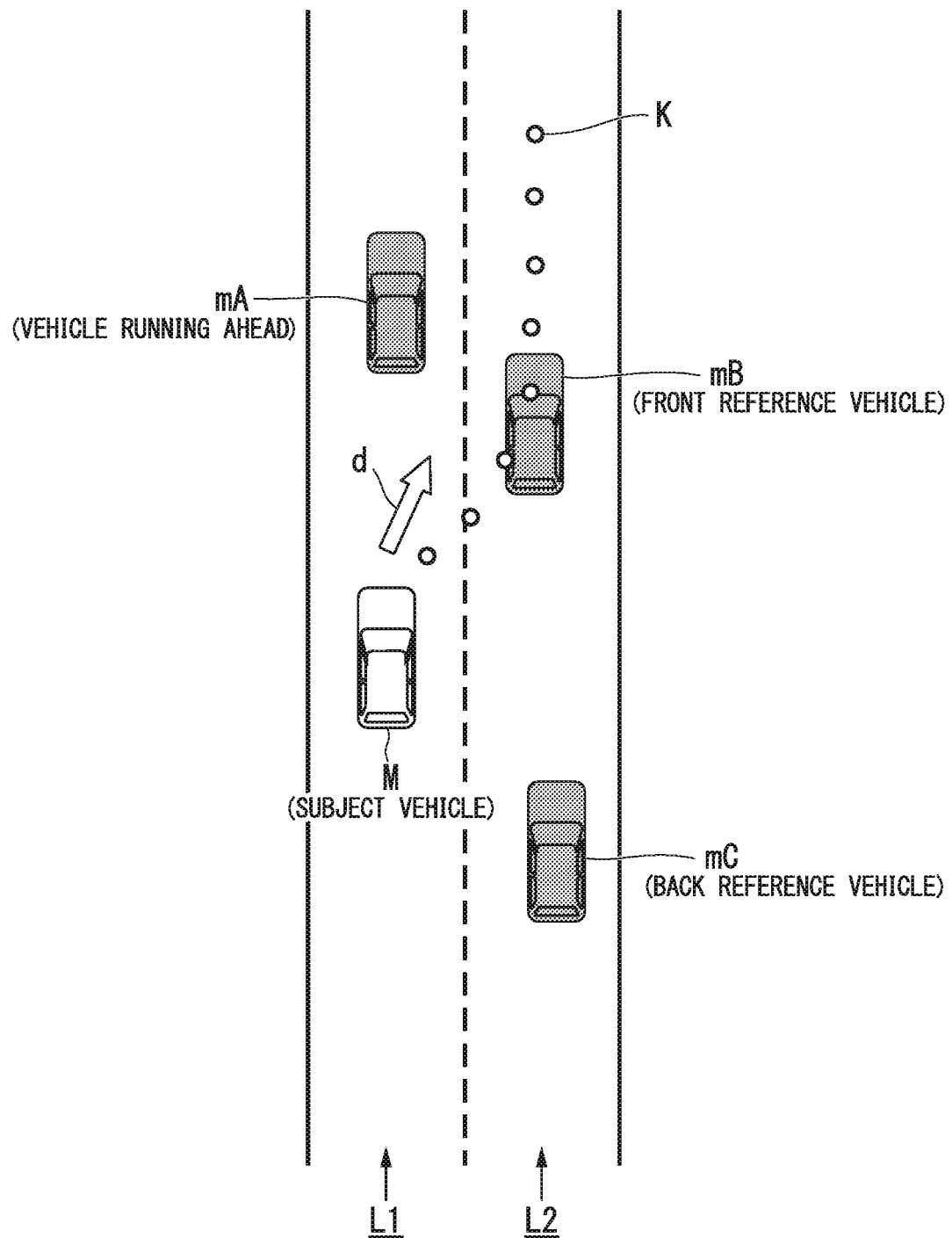
FIG. 9 is a diagram showing a view in which a locus for changing a lane is generated.

In a case in which the primary condition is satisfied, the lane change controller 158 causes the locus candidate generator 154 to generate candidates of a locus used for a lane change (Step S104). FIG. 9 is a diagram showing a view in which a locus for changing a lane is generated. For example, the locus candidate generator 154 assumes that a vehicle mA running ahead, the front reference vehicle mB, and the back reference vehicle mC runs at predetermined speed models and generates candidates of a locus on the basis of the speed models of these three vehicles and the speed of the subject vehicle M such that the subject vehicle M does not interfere with the vehicle mA running ahead and is positioned between the front reference vehicle mB and the back reference vehicle mC at a certain time in the future. For example, the locus candidate generator 154 smoothly connects from the current position of the subject vehicle M to the position of the front reference vehicle mB at a certain time in the future, the center of a lane that is a lane change destination, and an end place of the lane change using a polynomial curve such as a spline curve or the like and arranges a predetermined number of locus points K at uniform intervals or non-uniform intervals on this curve. At this time, the locus candidate generator 154 generates a locus such that at least one of the locus points K is disposed inside the target position TA.

Next, the evaluation selector 156 determines whether or not candidates of a locus satisfying a set condition have been generated (Step S106). Here, the set condition, for example, is acquisition of an evaluation value of a threshold or more from the viewpoints of planning and safety described above. In a case in which candidates of a locus satisfying the set condition have been generated, the evaluation selector 156, for example, selects a candidate of the locus having the highest evaluation value and outputs information of the locus to the running controller 160 and causes a lane change (Step S108). On the other hand, in a case in which a locus satisfying the set condition has not been generated, the process is returned to Step S100. At this time, similar to a case in which "No" is determined in Step S102, a process of causing a standby state or resetting the target position TA may be performed.

The running controller 160 performs control of the running driving force output device 90, the steering device 92, and the brake device 94 such that the subject vehicle M passes through the locus generated by the locus generator 150 at a planned time.

The switching controller 170 performs switching of a drive mode on the basis of a drive mode designation signal input from the changeover switch 80 and performs switching of the drive mode on the basis of an operation directing acceleration, deceleration, or steering for an operation device 70. For example, in a case in which a state, in which the amount of an operation input from the operation detecting sensor 72 exceeds a threshold, is continued for a reference time or more, the switching controller 170 performs switching from the automated drive mode to the manual drive mode. In addition, the switching controller 170 switches the drive mode from the automated drive mode to the manual drive mode near a destination of automated driving.

In a case in which switching from the manual drive mode to the automated drive mode is performed, the switching controller 170 performs the process on the basis of a drive mode designation signal input from the changeover switch 80.

In addition, in the case of an end place of automated driving or a predetermined state as will be described later, the switching controller 170 waits for elapse of a predetermined time and performs switching to the manual drive mode (handover). In the handover at the end place of automated driving, the switching controller 170 performs control such as a gradual decrease in speed or the like. In addition, in a case in which an operation directing acceleration, deceleration, or steering for the operation device 70 has not been detected for a predetermined time after switching from the automated drive mode to the manual drive mode is performed, control of returning to the automated drive mode may be performed.

[Process of Case in which Automated Driving Controller 120 is in Predetermined State (for Example, Abnormality)]

In a case in which the automated driving controller 120 is determined as being in a predetermined state by the monitor 250, the driving assistor 200 performs steering control according to a relation between the subject vehicle M and the lane. For example, the driving assistor 200 performs an assist for driving (for example, the lane keeping event, the lane changing event, or the like) that can be performed on the basis of a result of detection executed by the vicinity state detector among control operations started by the automated driving controller 120 or control operations planned to be started at a time point at which the automated driving controller 120 is determined to be in the predetermined state by the monitor 250. Here, "planned to be started" represents that a program executed by the automated driving controller 120 determines execution of the control in an action plan or the like.

In addition, in a case in which the automated driving controller 120 is determined to be in the predetermined state by the monitor 250, the driving assistor 200 may perform a control operation that can be continued, in other words, a function that can be assisted by each functional unit of the driving assistor 200 among control operations that have been started by the automated driving controller 120 or are planned to be started at a time point at which the predetermined state is determined.

Figure 10:
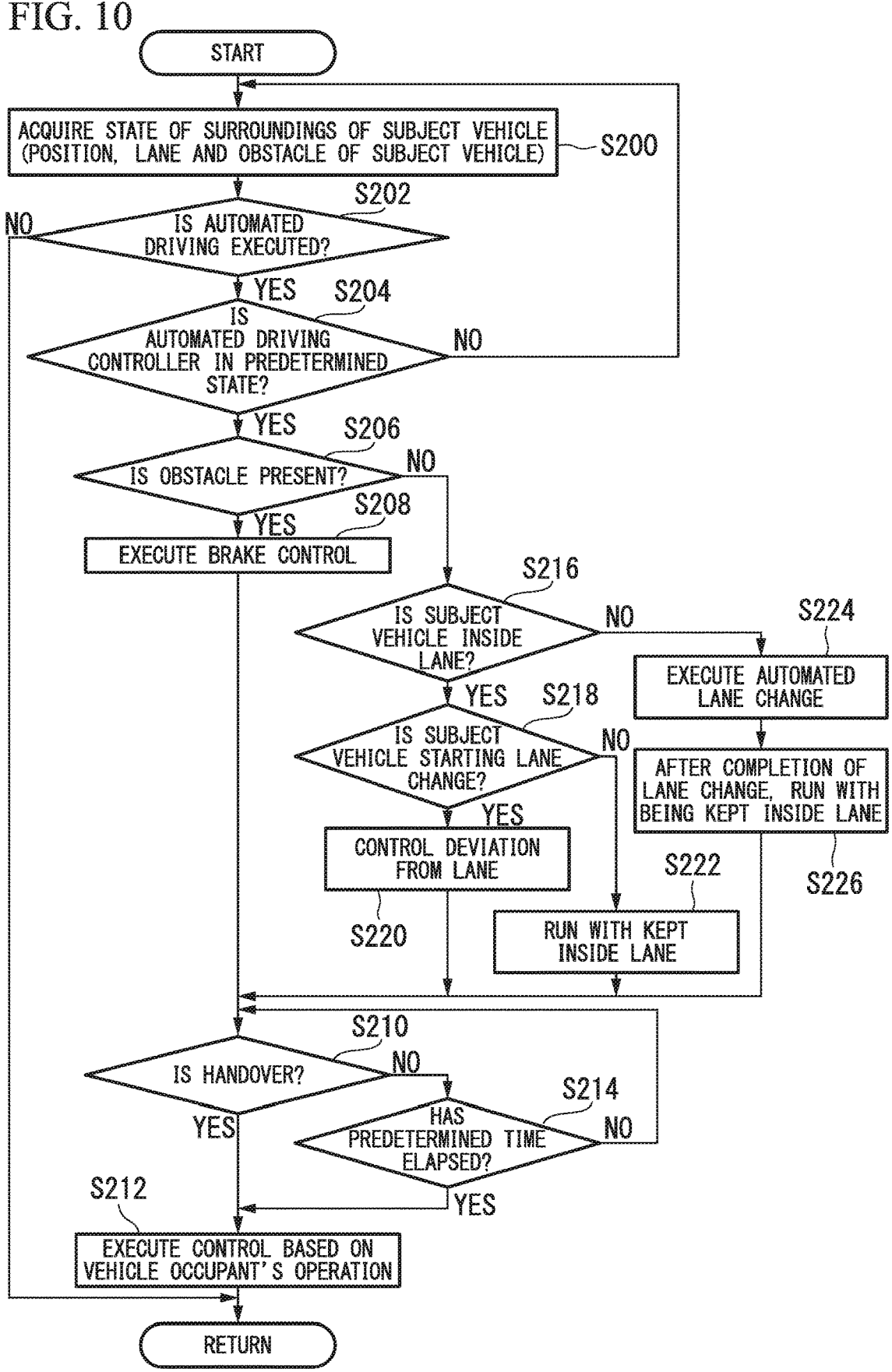
FIG. 10 is a flowchart that shows the flow of a process executed by a vehicle control system 100.

FIG. 10 is a flowchart that shows the flow of a process executed by the vehicle control system 100. First, the driving assistor 200 acquires states of surroundings of the subject vehicle M (Step S200). The states of surroundings of the subject vehicle M are a position and a lane of the subject vehicle M recognized by the assist-side subject vehicle position recognizer 210, obstacles recognized by the external system recognizer 130 or the assist-side external system recognizer 212, and the like.

Next, the monitor 250 determines whether or not automated driving is executed by the automated driving controller 120 (Step S202). In a case in which automated driving is not executed, the process of this flowchart ends. On the other hand, in a case in which automated driving is executed, the monitor 250 determines whether or not the automated driving controller 120 is in a predetermined state (Step S204). In a case in which the automated driving controller 120 is not in the predetermined state, the process is returned to the process of Step S200.

The predetermined state is a state in which the automated driving controller 120 cannot perform a process for realizing automated driving having high reliability. The predetermined state, for example, is a state in which the process of the automated driving controller 120 is stopped, a state in which the processing speed is lowered by a predetermined speed or more, a state in which an appropriate indication value necessary for automated driving cannot be output to each unit (the indication value is abnormal), a state in which a flag indicating error is included in output information, or the like. In addition, the predetermined state is a state in which information necessary for automated driving (the high-precision map information 182, information acquired from the finder 20, or the like) cannot be acquired. In a case in which the automated driving controller 120 is in the predetermined state, the monitor 250 limits a part or all of the operation of the automated driving controller 120. For example, the monitor 250 limits the operation of a functional unit that is in a predetermined state among functional units of the automated driving controller 120.

In a case in which the automated driving controller 120 is in the predetermined state, the driving assistor 200 determines whether or not an obstacle is present in the vicinity of the subject vehicle M on the basis of the information acquired in the process of Step S200 (Step S206). In a case in which an obstacle is present in the vicinity of the subject vehicle M, the avoidance controller 228 of the driving assistor 200 controls braking of the subject vehicle M on the basis of the states of surroundings of the subject vehicle M such that the subject vehicle M and the obstacle do not interfere with each other (Step S208). More specifically, the avoidance controller 228 causes the speaker 64 to output an alarm indicating that the automated driving controller 120 is in a predetermined state and decelerates or stops the subject vehicle M such that the subject vehicle M and the obstacle do not interfere with each other by controlling the brake device 94. In addition, the avoidance controller 228 causes the subject vehicle M to avoid the obstacle by controlling the steering device 92. Furthermore, for example, in a case in which a vehicle is present at the back of the subject vehicle M, the avoidance controller 228 controls the brake device 94 and the like such that the subject vehicle M does not interfere with the front-side obstacle and the back-side vehicle. In addition, each functional unit (the lane keeping assistor 222, the deviation suppressing controller 224, and the collision suppressor 226) of the automated driving controller 120 may also perform a process while braking control is performed.

Next, it is determined whether or not handover using the switching controller 170 has been completed (Step S210). In a case in which switching from the automated drive mode to the manual drive mode has been made, the driving assistor 200 stops the operation. Then, an operation directing acceleration, deceleration, or steering, which is performed by a vehicle occupant, received by the operation device 70 is transferred to the running driving force output device 90, the steering device 92, and the brake device 94, and the process proceeds to the manual drive mode (Step S212). In addition, even in a case in which switching to the manual drive mode is made, the driving assistor 200 may assist a vehicle occupant's driving of the subject vehicle M by performing various processes.

On the other hand, in a case in which switching from the automated drive mode to the manual drive mode is not made, the switching controller 170 determines whether or not a predetermined time has passed (Step S214). In a case in which the predetermined time has not passed, the process is returned to Step S210. On the other hand, in a case in which the predetermined time has passed, the process proceeds to Step S212. Then, after the process of Step S212, the process of one routine of this flowchart ends.

In a case in which it is determined that an obstacle is not present in the vicinity of the subject vehicle M in Step S206, the driving assistor 200 determines whether or not the subject vehicle M runs inside a running lane on the basis of a result of the recognition using the assist-side subject vehicle position recognizer 210 (Step S216). A state in which the subject vehicle M runs inside the running lane, for example, is a state in which the entire subject vehicle M is inside the running lane.

In the case of a state in which the subject vehicle M is inside the running lane in Step S216, the driving assistor 200 determines whether or not the subject vehicle M is in the state of starting a lane change (Step S218). The state in which the subject vehicle M is starting a lane change is a state in which the subject vehicle M actually is executing a behavior for changing the lane.

In a case in which the subject vehicle M is in the state of starting a lane change in Step S218, the driving assistor 200 causes the speaker 64 to output an alarm indicating that the automated driving controller 120 is in a predetermined state and performs control of the subject vehicle M such that the subject vehicle M does not deviate from the running lane (Step S220). For example, in a case in which a surrounding vehicle is not present in the vicinity of the subject vehicle M, the deviation suppressing controller 224 of the driving assistor 200 performs control of the subject vehicle M such that the subject vehicle M does not deviate from the running lane. On the other hand, in a case in which a surrounding vehicle is present in the vicinity of the subject vehicle M, the collision suppressor 226 of the driving assistor 200 performs control of the subject vehicle M such that the subject vehicle M does not deviate from the running lane. In addition, after the subject vehicle M is returned to the center of the running lane in accordance with the control of the deviation suppressing controller 224 or the collision suppressor 226, the lane keeping assistor 222 may perform control of the subject vehicle M such that the subject vehicle M runs at the center of the running lane. Then, the process proceeds to Step S210.

As described above, even in a state in which the subject vehicle M is starting a lane change, in the case of a state in which the subject vehicle M is inside the running lane, the driving assistor 200 recognizes that the subject vehicle M is not to move to an adjacent lane and performs control of the subject vehicle M that the subject vehicle M does not deviate from the running lane without performing a lane change. Accordingly, the vehicle control system 100 can improved the running stability of the subject vehicle M. In addition, the vehicle control system 100 can reduce causing a sense of discomfort to the vehicle occupant.

In a case in which the subject vehicle M is not in the state of starting a lane change in Step S218, the lane keeping assistor 222 of the driving assistor 200 performs control of the subject vehicle M such that the subject vehicle M runs at the center of the running lane (Step S222). In this case, the lane keeping assistor 222 may cause the speaker 64 to output an alarm indicating that the automated driving controller 120 is in a predetermined state. Then, the process proceeds to Step S210.

In the case of the state in which the subject vehicle M is not inside the running lane in Step S216, the lane change assistor 230 of the driving assistor 200 automatically changes the lane of the subject vehicle M by controlling the subject vehicle M (Step S224). In the case of a state in which the subject vehicle M is not inside the running lane, it is presumed that a lane change is executed or to be executed, and accordingly, the lane change assistor 230 recognizes that the subject vehicle M is moving to an adjacent lane and executes a lane change. In this way, the driving assistor 200 can continue the control to be executed by the automated driving controller 120.

Next, the lane keeping assistor 222 of the driving assistor 200 performs control of the subject vehicle M such that the subject vehicle M runs at the center of the running lane in which the subject vehicle M runs after completion of the lane change (Step S226). Then, the process proceeds to Step S210. In this way, the process of one routine of this flowchart ends.

In addition, the state in which the subject vehicle M is starting a lane change in Step S218 may be a state in which an indication value for a lane change is output to the steering device 92 or the like or a state in which there is an action plan for a lane change after a predetermined time. In such a case, since the subject vehicle M is not actually executing a behavior for a lane change, the lane keeping assistor 222 of the driving assistor 200 may perform control of the subject vehicle M such that the subject vehicle M runs at the center of the running lane in Step S220.

In addition, the process of Step 218 may be omitted. In such a case, the driving assistor 200 performs control of the subject vehicle M such that the subject vehicle M is returned to the center of the running lane or the subject vehicle M runs at the center of the running lane on the basis of positions of the subject vehicle M and a dividing line and the state of the subject vehicle M.

According to the process described above, even in a case in which a state, in which automated driving cannot be continued, occurs during automated driving in the subject vehicle M, a sense of discomfort given to a vehicle occupant can be reduced by appropriately controlling the subject vehicle M.

Figure 11:
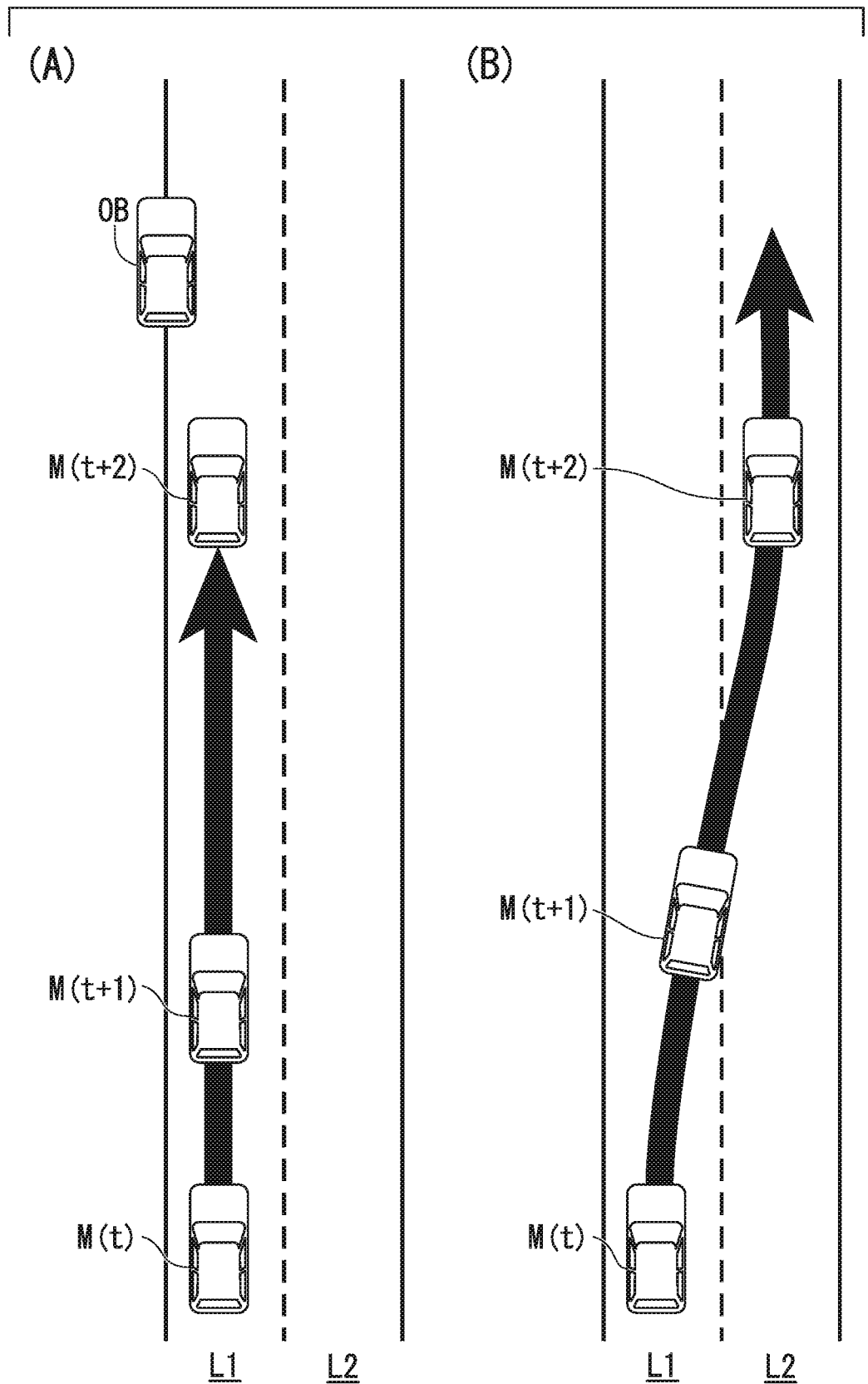
FIG. 11 is a diagram showing one example of control in a scene in which an obstacle OB is present in front of the subject vehicle M or a scene in which the subject vehicle M changes a lane.

Here, for example, in a case in which an obstacle is present in front of the subject vehicle M, the avoidance controller 228 of the driving assistor 200 performs control of the subject vehicle M such that the subject vehicle M and the obstacle do not interfere with each other. FIG. 11(A) is a diagram showing one example of control in a scene in which an obstacle OB is present in front of the subject vehicle M. For example, at a time t, the subject vehicle M is assumed to run through automated driving. At a time t+1, in a case in which the automated driving cannot be continued, and an obstacle OB is present in front of the subject vehicle M, the subject vehicle M decelerates. Then, at a time t+2, the subject vehicle M stops in front of the obstacle OB. In this way, even in a case in which an obstacle OB is present in front of the subject vehicle M in a state in which automated driving cannot be continues during the automated driving, the subject vehicle M can avoid an interference with the obstacle OB.

For example, in a case in which an obstacle is not present in front of the subject vehicle M, and the subject vehicle M is not inside the running lane, the lane change assistor 230 of the driving assistor 200 performs control such that the subject vehicle M executes a lane change. FIG. 11(B) is a diagram showing one example of control in a scene in which a subject vehicle M changes a lane. For example, at a time t+1, in a case in which automated driving cannot be continues, and the subject vehicle M is not inside the running lane L1, the subject vehicle M changes the lane. Then, after the lane change is completed at a time t+2, the subject vehicle M runs inside an adjacent lane L2 that is a lane after the lane change. In this way, even in a case in which the subject vehicle M is starting a lane change in a state in which automated driving cannot be continued during the automated driving, the subject vehicle M can continue the lane change and run in the adjacent lane L2 that is a destination lane of the lane change.

Figure 12:
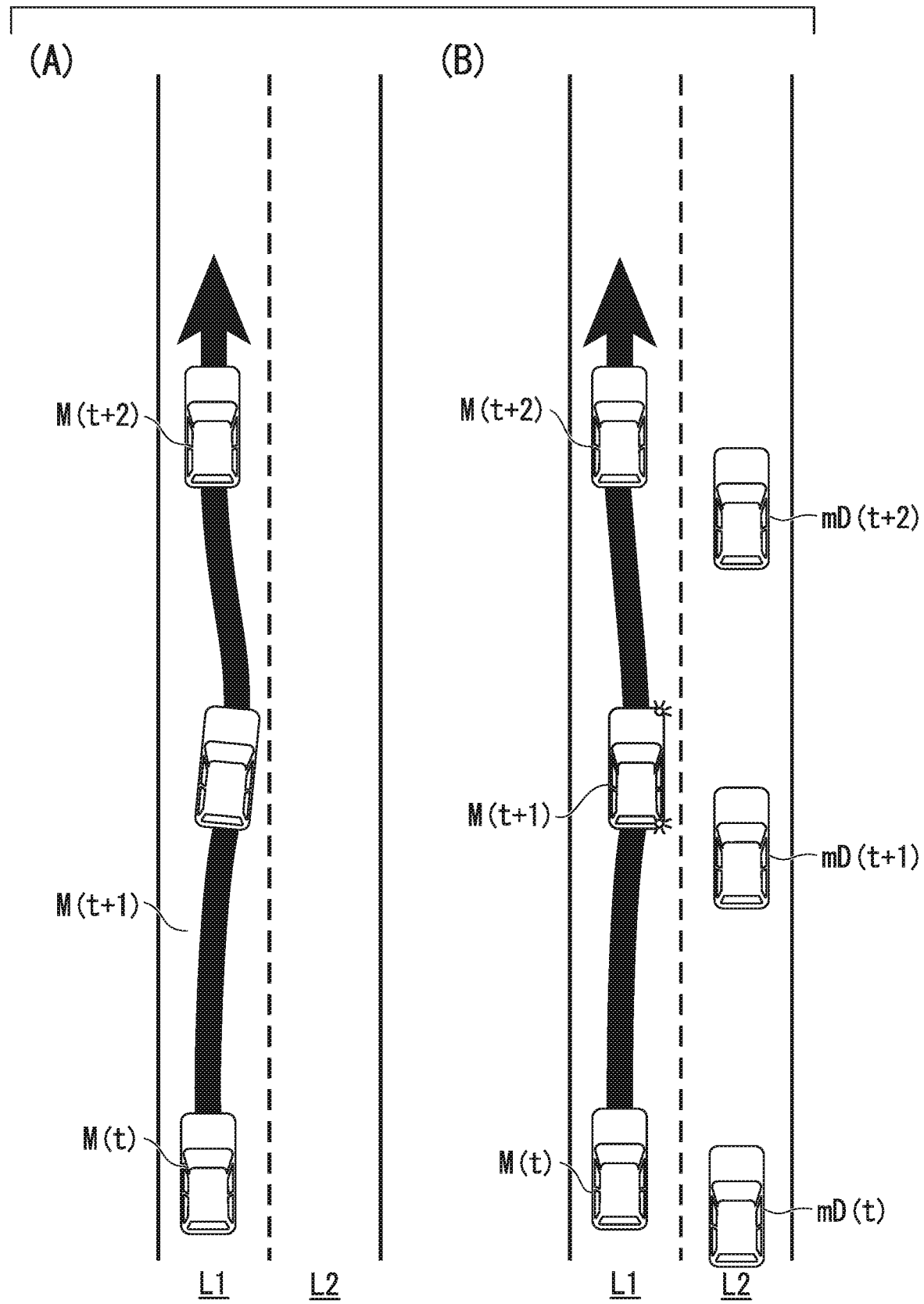
FIG. 12 is a diagram showing an example of realization of a process of Step S220.

FIG. 12 is a diagram showing an example of realization of the process of Step S220 described above. For example, in a case in which an obstacle is not present in front of the subject vehicle M, the subject vehicle M enters the running lane, and the subject vehicle M starts a lane change, the driving assistor 200 performs control such that the subject vehicle M does not deviate from the running lane. FIG. 12(A) is a diagram showing one example of a scene in which a subject vehicle M is controlled not to deviate from a running lane L1. For example, at a time t+1, in a case in which automated driving cannot be continued, a surrounding vehicle is not present in the adjacent lane L2, and the subject vehicle M is to deviate from the running lane L1, the deviation suppressing controller 224 performs control such that the subject vehicle M does not deviate from the running lane L1. Then, at a time t+2, the subject vehicle M is returned to the center of the running lane L1 and runs at the center of the running lane L1. In this way, even in a case in which automated driving cannot be continued during the automated driving, and a lane change is executed through automated driving, when the amount of horizontal movement of the subject vehicle M is small, the subject vehicle M runs in the running lane L1 without executing the lane change, and accordingly, the running stability can be improved.

FIG. 12(B) is a diagram showing another example of a scene in which a subject vehicle M is controlled not to deviate from a running lane L1. In the example shown in the drawing, a surrounding vehicle mD runs in an adjacent lane L2 adjacent to the running lane L1 in which the subject vehicle M runs. For example, the surrounding vehicle mD runs at a position that is located at the back of the subject vehicle M and overlaps with the horizontal direction of the subject vehicle M. For example, at a time t+1, in a case in which automated driving cannot be continued, and the subject vehicle M is to deviate from the running lane L1 to the adjacent lane L2, not the deviation suppressing controller 224 but the collision suppressor 226 starts to operate. Then, the collision suppressor 226 executes intervention more quickly than in the scene shown in FIG. 12(A) described above such that the subject vehicle M does not deviate from the running lane L1. Then, at a time t+2, the subject vehicle M is returned to the center of the running lane L1 and runs at the center of the running lane L1. In this way, in the case of a state in which a surrounding vehicle is present, the subject vehicle M is returned to the center of the running lane L1 more quickly and can run at the center of the running lane L1.

According to the first embodiment described above, in a case in which the automated driving controller 120 is determined to be in a predetermined state by the monitor 250, the vehicle control system 100 performs steering control according to a relation between the subject vehicle M and the lane, whereby a sense of discomfort given to a vehicle occupant can be reduced.

Second Embodiment

Hereinafter, a second embodiment will be described. The driving assistor 200 of the vehicle control system 100 according to the first embodiment acquires information that is acquired using the radar 30 and the camera 40, and the automated driving controller 120 acquires information that is acquired using the finder 20. On the other hand, in a vehicle control system 100A according to the second embodiment, an automated driving controller 120 and a driving assistor 200 acquire information that is acquired using a finder 20, a radar 30, and a camera 40. Hereinafter, relating differences will be focused in description. The same reference sign will be assigned to a constituent element having the same function as that according to the first embodiment, and description thereof will not be presented as is appropriate.

Figure 13:
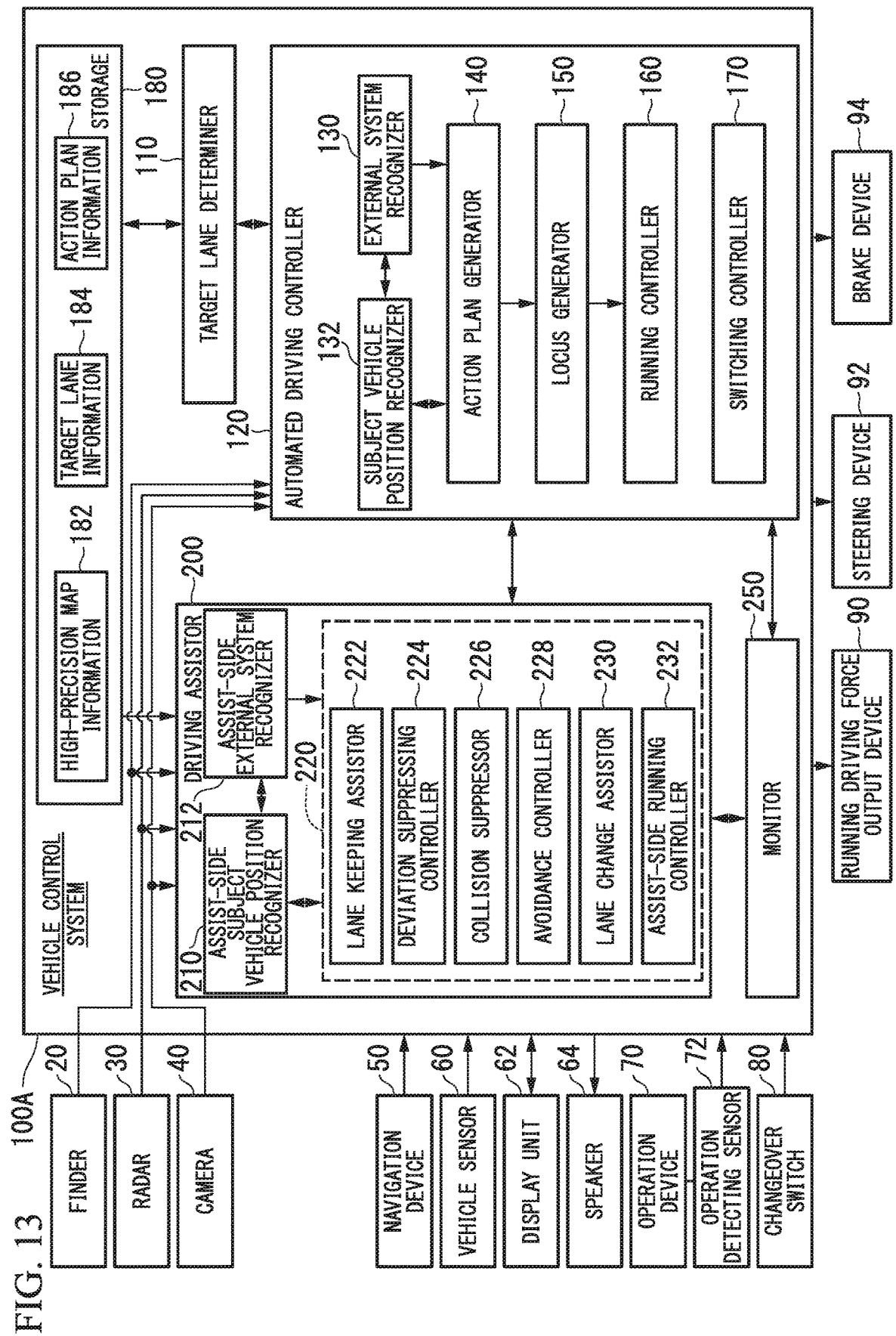
FIG. 13 is a functional configuration diagram of a subject vehicle M focusing on a vehicle control system 100A according to a second embodiment.

FIG. 13 is a functional configuration diagram of a subject vehicle M focusing on the vehicle control system 100A according to a second embodiment. An automated driving controller 120 according to the second embodiment further includes a subject vehicle position recognizer 132 in addition to the functional configuration of the first embodiment. The subject vehicle position recognizer 132 recognizes a running lane and a relative position of the subject vehicle M with respect to the running lane on the basis of information input from a radar 30, a camera 40, or a vehicle sensor 60.

The driving assistor 200 acquires information that is acquired using the finder 20, the radar 30, and the camera 40. An assist-side external system recognizer 212 recognizes states such as a position, a speed, and an acceleration of a surrounding vehicle on the basis of information input from the finder 20. In addition, the assist-side external system recognizer 212 may recognize the positions of a guard rail, a telegraph pole, a parked vehicle, a pedestrian, and other objects in addition to the surrounding vehicles. In addition, the driving assistor 200 acquires information stored in a storage 180.

According to the second embodiment described above, the automated driving controller 120 and the driving assistor 200 acquire the information that is acquired by using the finder 20, the radar 30, and the camera 40 and recognizes surrounding vehicles, the position of the subject vehicle M, a lane, and the like on the basis of the acquired information. As a result, even in a case in which a malfunction occurs in one of the automated driving controller 120 and the driving assistor 200, the vehicle control system 100A can detect information of the position of the subject vehicle M or information of surroundings of the subject vehicle M with a higher accuracy.

As above, while the embodiments of the present invention have been described, the present invention is not limited to such embodiments at all, and various modifications and substitutions may be made in a range not departing from the concept of the present invention.

REFERENCE SIGNS LIST

20 Finder
30 Radar
40 Camera
50 Navigation device
60 Vehicle sensor
62 Display unit
64 Speaker
70 Operation device
72 Operation detecting sensor
80 Changeover switch
90 Running driving force output device
92 Steering device
94 Brake device
100, 100A Vehicle control system
110 Target lane determiner
120 automated driving controller
130 External system recognizer
140 Action plan generator
150 Locus generator
154 Locus candidate generator
160 Running controller
170 Switching controller
180 Storage
182 High-precision map information
200 Driving assistor
210 Assist-side subject vehicle position recognizer
212 Assist-side external system recognizer
222 Lane keeping assistor
224 Deviation suppressing controller
226 Collision suppressor
228 Avoidance controller
230 Lane change assistor
232 Assist-side running controller
M Subject vehicle

What is claim is:
1. A vehicle control system comprising:
  a surrounding state detector is configured to detect a state of proximate surroundings of a subject vehicle;
  a first running assistor is configured to automatically control at least acceleration/deceleration or steering of the subject vehicle such that the subject vehicle can run along a route to a destination by referring to a result of detection executed by the surrounding state detector;

a monitor is configured to monitor whether or not the first running assistor is in a predetermined state and limit an operation of the first running assistor in a case in which the first running assistor is in the predetermined state; and a second running assistor is configured to assist a vehicle occupant's driving of the subject vehicle based on the result of the detection executed by the surrounding state detector and perform steering control according to a relation between the subject vehicle and a lane in a case in which the first running assistor is determined as being in the predetermined state by the monitor, wherein the second running assistor comprises a lower degree of control than control executed by the first running assistor, wherein the predetermined state is a state in which an abnormality occurs in the first running assistor due to a different factor than an operation by the occupant of the subject vehicle or a state in which information necessary for control using the first running assistor cannot be acquired, and wherein the second running assistor is further configured to:

control the subject vehicle to remain within a running lane when the first running assistor is in the predetermined state and the subject vehicle is within the running lane, and control the subject vehicle to change lanes when the first running assistor is in the predetermined state and the subject vehicle is partially external to the running lane.

2. The vehicle control system according to claim 1, wherein, upon detection of the predetermined state of the first running assistor by the monitor, the second running assistor is configured to perform assist of driving based on the result of the detection executed by the surrounding state detector using a subset of control operations comprising control operations started or planned to be started by the first running assistor when the monitor detected the predetermined state.

3. The vehicle control system according to claim 1 or claim 2, wherein the second running assistor is configured to change assist of driving control operations to be executed based on the result of the detection executed by the surrounding state detector when the monitor detected the predetermined state of the first running assistor.

4. The vehicle control system according to claim 3, wherein, upon detection of the predetermined state of the first running assistor by the monitor, the second running assistor is configured to determine whether to control the subject vehicle such that it does not deviate from the running lane or to perform a lane change to a new lane in accordance with a lane change state of the subject vehicle when the monitor detected the predetermined state.

5. The vehicle control system according to claim 4, wherein, upon detection of the predetermined state of the first running assistor by the monitor, the second running assistor is configured to control the subject vehicle such that it performs the lane change when the result of the detection executed by the surrounding state detector indicates that the lane change state corresponds to a state in which the subject vehicle is partially external to the running lane when the monitor detected the predetermined state.

6. The vehicle control system according to claim 5, wherein, in a case in which the lane change is completed, the second running assistor is configured to control the subject vehicle to run while keeping in the new lane.

7. The vehicle control system according to claim 1 or claim 2, wherein the first running assistor is configured to generate a plan for changing a lane of the subject vehicle and output an indication value for executing the plan to a control device controlling at least one of acceleration/deceleration and steering of the subject vehicle on the basis of the generated plan, and wherein, in a case in which the first running assistor is determined as being in the predetermined state by the monitor, the second running assistor is configured to perform control such that the subject vehicle does not deviate from the running lane in a state in which the indication value for executing the plan is output at a time point at which the predetermined state is determined or in a case in which the plan is generated at a time point at which the predetermined state is determined.

8. The vehicle control system according to claim 1 or claim 2, wherein, in a case in which the first running assistor is determined as being in the predetermined state by the monitor, the second running assistor, in a case in which the subject vehicle is not recognized as having moved from the running lane to a another lane on the basis of the result of the detection executed by the surrounding state detector at a time point at which the predetermined state is determined, is configured to control the subject vehicle such that it does not change lanes.

9. The vehicle control system according to claim 1 or claim 2, wherein, in a case in which the first running assistor is determined as being in the predetermined state by the monitor, the second running assistor, in a case in which an obstacle is detected in an advancement direction of the subject vehicle by the surrounding state detector, is configured to decelerate or stop the subject vehicle.

10. The vehicle control system according to claim 1 or claim 2, wherein the second running assistor is configured to complete steering control according to a relation between the subject vehicle and a lane until a transition to vehicle control using a vehicle occupant's operation is made from the time point at which the first running assistor is determined as being in the predetermined state by the monitor.

11. The vehicle control system according to claim 1, wherein the second running assistor if further configured to:

control the subject vehicle to move to a new lane from the running lane when the first running assistor is in the predetermined state and the subject vehicle is partially external to the running lane, and control the subject vehicle to run at a center of the new lane after the subject vehicle moves to the new lane.

12. The vehicle control system according to claim 1, wherein the second running assistor if further configured to:

control the subject vehicle such that the subject vehicle does not deviate from the running lane when the first running assistor is in the predetermined state, the subject vehicle is inside the running lane, and the subject vehicle is executing behavior for changing to a new lane, and control the subject vehicle to run at a center of the running lane when the first running assistor is in the predetermined state, the subject vehicle is inside the running lane, and the subject vehicle is not executing a behavior for changing to a new lane.

13. The vehicle control system according to claim 1, wherein the state in which the abnormality occurs is a state in which a process of the first running assistor stops, a state in which a processing speed of the first running assistor is lowered by at least a predetermined speed, a state in which an indication value output by the first running assistor necessary for controlling automatically at least acceleration/deceleration or steering of the subject vehicle is abnormal, or a state in which information indicating error is included in data output by the first running assistor.

14. The vehicle control system according to claim 1, wherein the second running assistor is further configured to:

decelerate or stop the subject vehicle such that the subject vehicle and an obstacle do not interfere with each other when the first running assistor is in the predetermined state and the obstacle is detected in an advancement direction of the subject vehicle by the surrounding state detector;

control the subject vehicle to run inside the running lane when the first running assistor is in the predetermined state, the obstacle is not detected in the advancement direction of the subject vehicle, and the subject vehicle is inside the running lane; and control the subject vehicle to move to a new lane from the running lane when the first running assistor is in the predetermined state, the obstacle is not detected in the advancement direction of the subject vehicle, and the subject vehicle partially external to the running lane.

15. A vehicle control system comprising:

a surrounding state detector is configured to detect a state of proximate surroundings of a subject vehicle;

a first running assistor automatically is configured to control at least acceleration/deceleration or steering of the subject vehicle such that the subject vehicle can run along a route to a destination by referring to a result of the detection executed by the surrounding state detector;

a monitor is configured to monitor whether or not the first running assistor is in a predetermined state and limit an operation of the first running assistor in a case in which the first running assistor is in the predetermined state; and a second running assistor is configured to assist a vehicle occupant's driving of the subject vehicle based on the result of the detection executed by the surrounding state detector upon detection of the predetermined state of the first running assistor by the monitor using a subset of control operations comprising control operations started or planned to be started by the first running assistor when the monitor detected the predetermined state, wherein the second running assistor comprises a lower degree of control than control executed by the first running assistor, wherein the predetermined state is a state in which an abnormality occurs in the first running assistor due to a different factor than an operation by the occupant of the subject vehicle or a state in which information necessary for control using the first running assistor cannot be acquired, and wherein the second running assistor is further configured to:

control the subject vehicle to remain within a running lane when the first running assistor is in the predetermined state and the subject vehicle is within the running lane, and control the subject vehicle to change lanes when the first running assistor is in the predetermined state and the subject vehicle is partially external to the running lane.

16. A vehicle control system comprising:

a surrounding state detector is configured to detect a state of proximate surroundings of a subject vehicle;

a first running assistor is configured to automatically control at least steering of the subject vehicle such that the subject vehicle can run along a route to a destination by referring to a result of the detection executed by the surrounding state detector;

a monitor is configured to monitor whether or not the first running assistor is in a predetermined state and limit an operation of the first running assistor in a case in which the first running assistor is in the predetermined state; and a second running assistor is configured to assist a vehicle occupant's driving of the subject vehicle based on the result of the detection executed by the surrounding state detector and, in a case in which the first running assistor is determined as being in the predetermined state by the monitor, perform steering control according to a relation between the subject vehicle and a lane until a transition to vehicle control using a vehicle occupant's operation is made from a time point at which the first running assistor is determined to be in the predetermined state by the monitor, wherein the predetermined state is a state in which an abnormality occurs in the first running assistor due to a different factor than an operation by the occupant of the subject vehicle or a state in which information necessary for control using the first running assistor cannot be acquired, wherein the second running assistor comprises a lower degree of control than control executed by the first running assistor, and wherein the second running assistor is further configured to:

control the subject vehicle to remain within a running lane when the first running assistor is in the predetermined state and the subject vehicle is within the running lane, and control the subject vehicle to change lanes when the first running assistor is in the predetermined state and the subject vehicle is partially external to the running lane.

17. A vehicle control method using an in-vehicle computer, the vehicle control method comprising:

monitoring whether or not there is a state in which an abnormality occurs in a first running assistor or a state in which information necessary for control using the first running assistor cannot be acquired, wherein the first running assistor is configured to automatically control at least acceleration/deceleration or steering of a subject vehicle such that the subject vehicle can run along a route to a destination by referring to a result of detection executed by a surrounding state detector, wherein the surrounding state detector is configured to detect a state of proximate surroundings of the subject vehicle, and wherein the abnormality occurs due to a different factor than an operation by the occupant of the subject vehicle;

limiting an operation of the first running assistor in the case of the state in which an abnormality occurs in the first running assistor or the state in which information necessary for control using the first running assistor cannot be acquired; and assisting a vehicle occupant's driving of the subject vehicle using a second running assistor by performing steering control according to a relation between the subject vehicle and a lane based on the result of the detection executed by the surrounding state detector when the state in which an abnormality occurs in the first running assistor or the state in which information necessary for control using the first running assistor cannot be acquired is determined through the monitoring;

wherein the second running assistor comprises a lower degree of control than control executed by the first running assistor, and wherein the second running assistor is configured to:

control the subject vehicle to remain within a running lane when the first running assistor is in the predetermined state and the subject vehicle is within the running lane, and control the subject vehicle to change lanes when the first running assistor is in the predetermined state and the subject vehicle is partially external to the running lane.

18. A non-transitory computer-readable storage medium that stores a vehicle control computer program to be executed by a computer to perform at least:

monitor whether or not there is a state in which an abnormality occurs in a first running assistor or a state in which information necessary for control using the first running assistor cannot be acquired, wherein the first running assistor is configured to automatically control at least acceleration/deceleration or steering of a subject vehicle such that the subject vehicle can run along a route to a destination by referring to a result of detection executed by a surrounding state detector, wherein the surrounding state detector is configured to detect a state of proximate surroundings of the subject vehicle, wherein the abnormality occurs due to a different factor than an operation by the occupant of the subject vehicle;

limit an operation of the first running assistor in the case of the state in which an abnormality occurs in the first running assistor or the state in which information necessary for control using the first running assistor cannot be acquired; and assist a vehicle occupant's driving of the subject vehicle based on the result of the detection executed by the surrounding state detector using a second running assistor by performing steering control according to a relation between the subject vehicle and a lane when the state in which an abnormality occurs in the first running assistor or the state in which information necessary for control using the first running assistor cannot be acquired is determined through the monitoring;

wherein the second running assistor comprises a lower degree of control than control executed by the first running assistor, and wherein the second running assistor is configured to:

control the subject vehicle to remain within a running lane when the first running assistor is in the predetermined state and the subject vehicle is within the running lane, and control the subject vehicle to change lanes when the first running assistor is in the predetermined state and the subject vehicle is partially external to the running lane.

* * * * *